United States Patent [19]

Henderson et al.

[11] B 3,990,055
[45] Nov. 2, 1976

[54] CONTROL SYSTEM FOR MAGNETIC DISC STORAGE DEVICE

[75] Inventors: Edward E. Henderson, Philadelphia; Akira Fujimoto, Conshohocken; Stanley E. Gaw, Roslyn, all of Pa.

[73] Assignee: Sperry Rand Corporation, Blue Bell, Pa.

[22] Filed: Sept. 6, 1974

[21] Appl. No.: 503,780

[44] Published under the second Trial Voluntary Protest Program on March 16, 1976 as document No. B 503,780.

[52] U.S. Cl. .......................................... 340/172.5
[51] Int. Cl.² ........................................ G06F 3/00
[58] Field of Search ............................. 340/172.5

[56] References Cited
UNITED STATES PATENTS

| | | | |
|---|---|---|---|
| 3,312,951 | 4/1967 | Hertz | 340/172.5 |
| 3,355,718 | 11/1967 | Talarczyk | 340/172.5 |
| 3,408,632 | 10/1968 | Hauck | 340/172.5 |
| 3,587,058 | 6/1971 | Butler et al. | 340/172.5 |
| 3,629,860 | 12/1971 | Capozzi | 340/172.5 |

Primary Examiner—Joseph F. Ruggiero
Attorney, Agent, or Firm—John B. Sowell; William E. Cleaver; Marshall M. Truex

[57] ABSTRACT

An improved control system for a plurality of magnetic disc storage devices which connects one of said devices to a central processing unit for the transmission of data records to or from the central processing unit. The improvement comprises a unit logic controller connected to each disc storage device for receiving and storing priority control information and sector address information associated with a seek operation for a data record address. The unit logic controllers raise an alert signal when the data record address being sought is near the read-write head. The disc storage device having the highest priority associated with its alert signal is connected to the central processing unit for the transfer of data records by the control system. The improved control system requires that the central processing unit be connected to the disc storage device and the unit logic controller for the minimum amount of time during the process of locating a desired data record.

34 Claims, 13 Drawing Figures

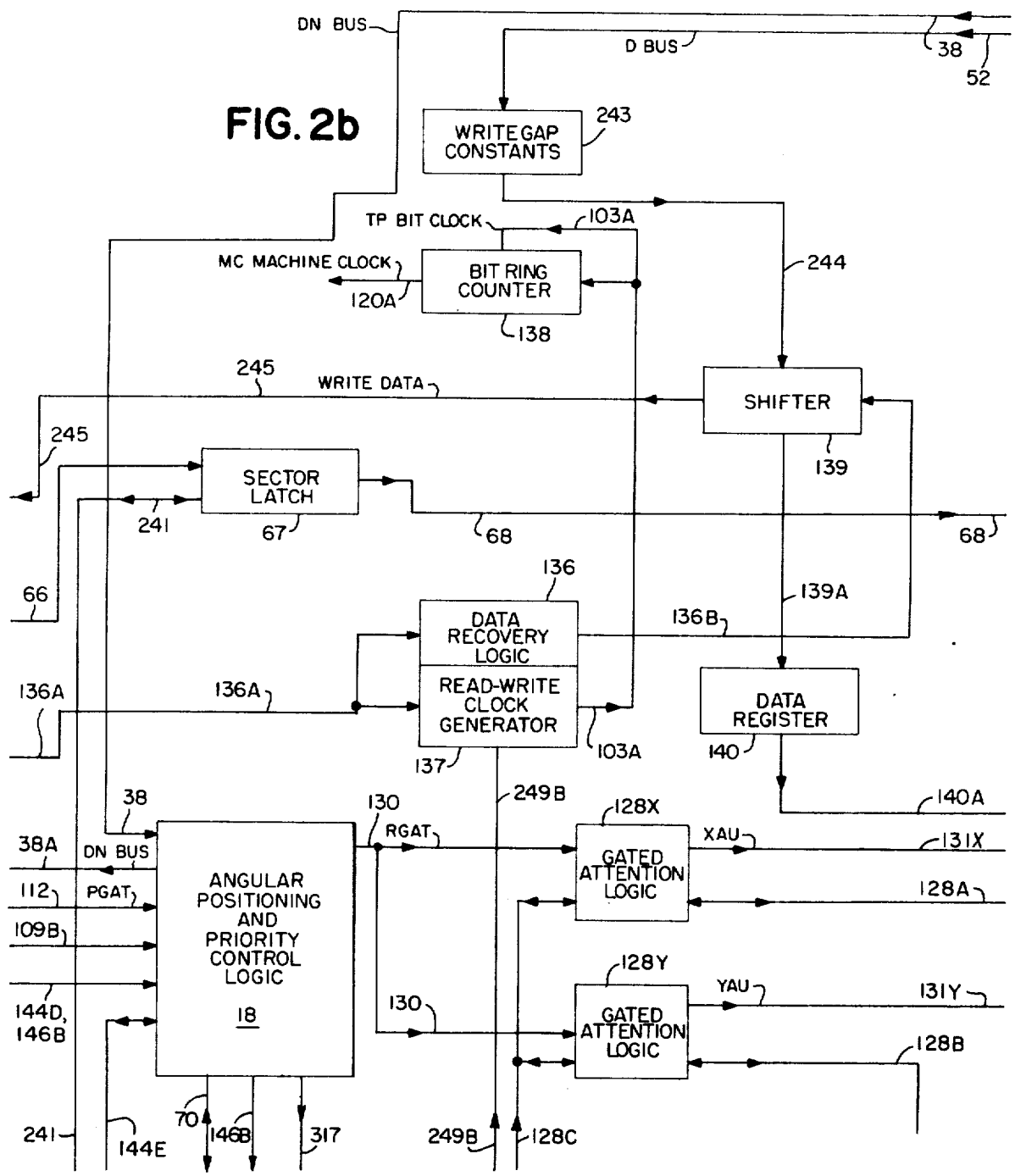

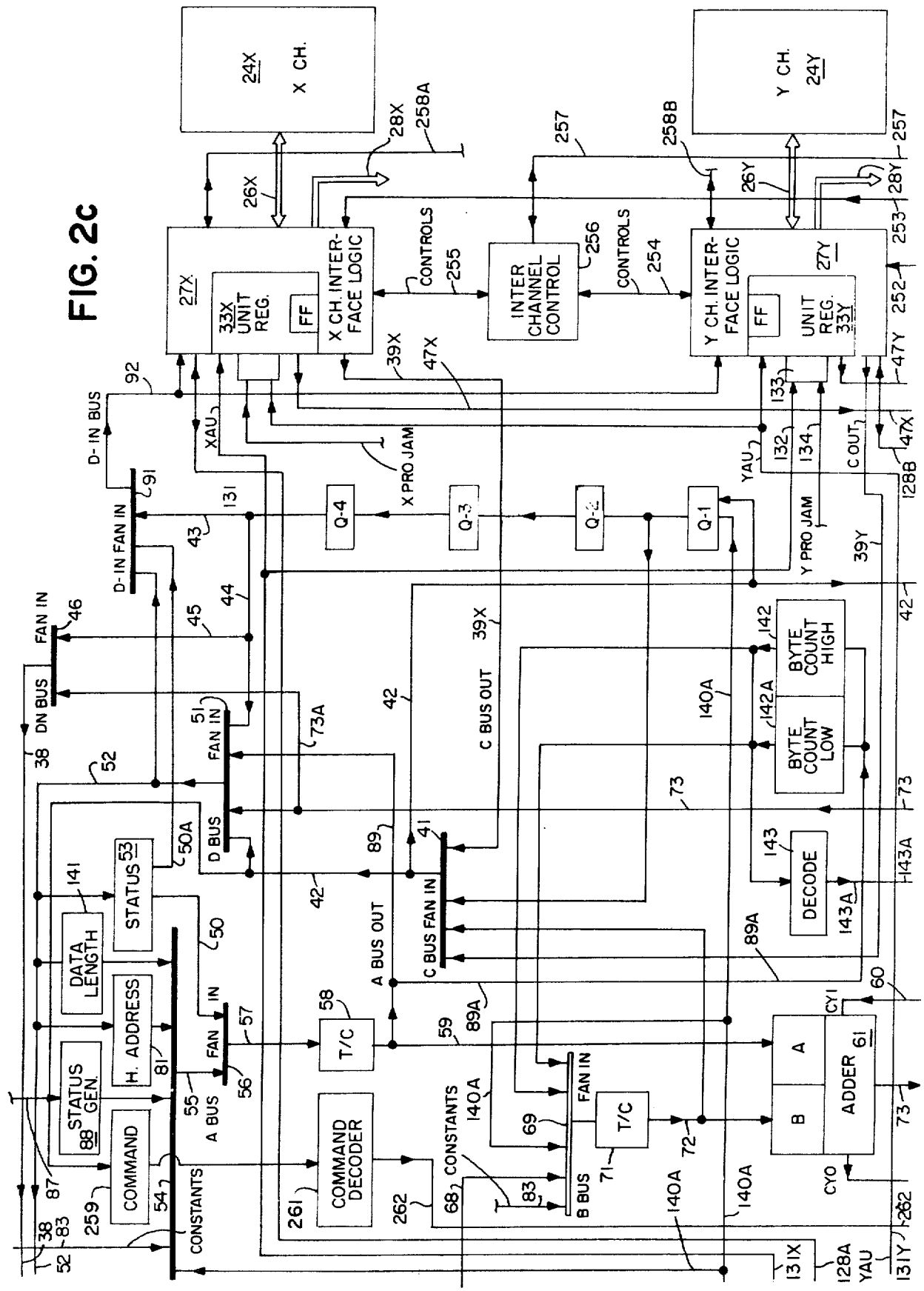

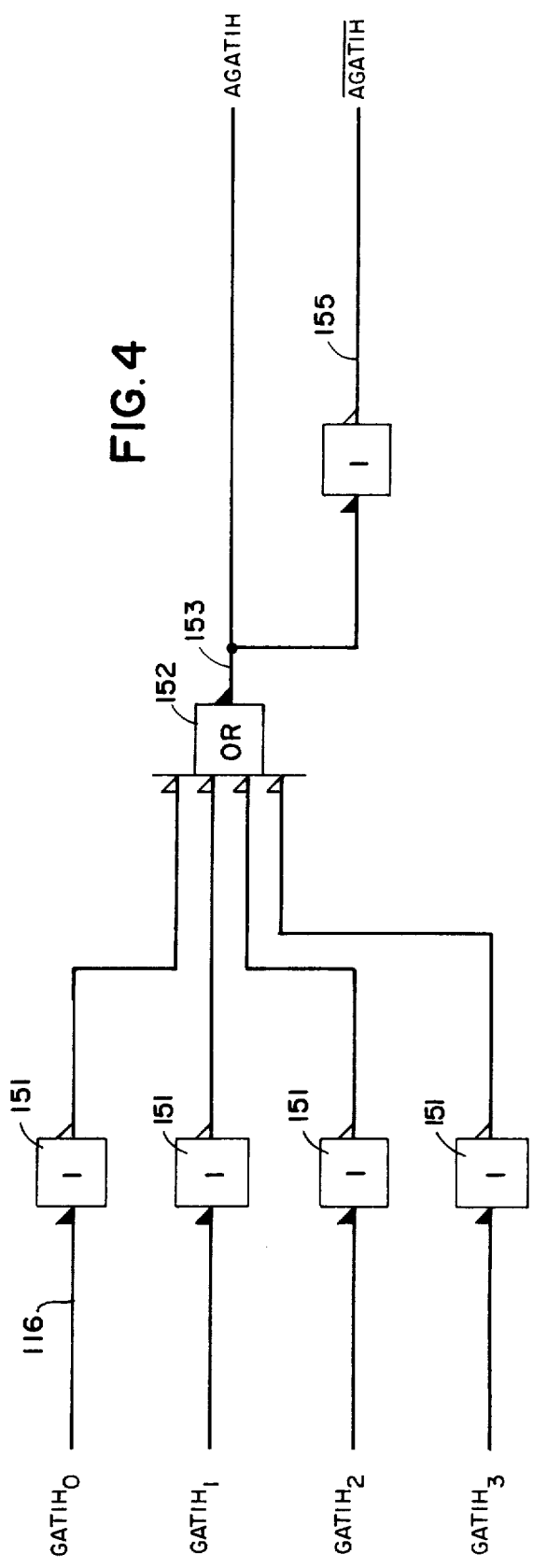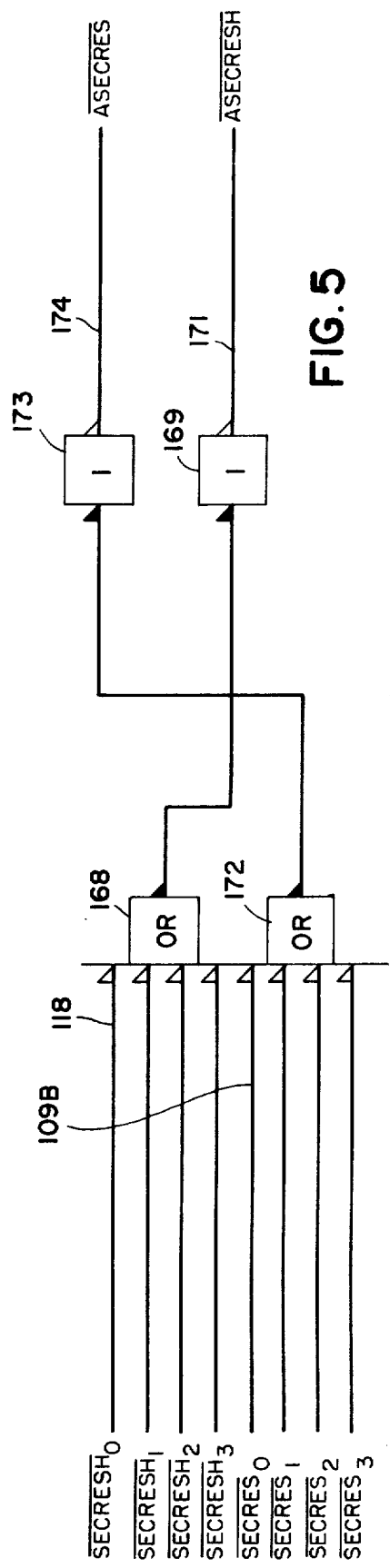

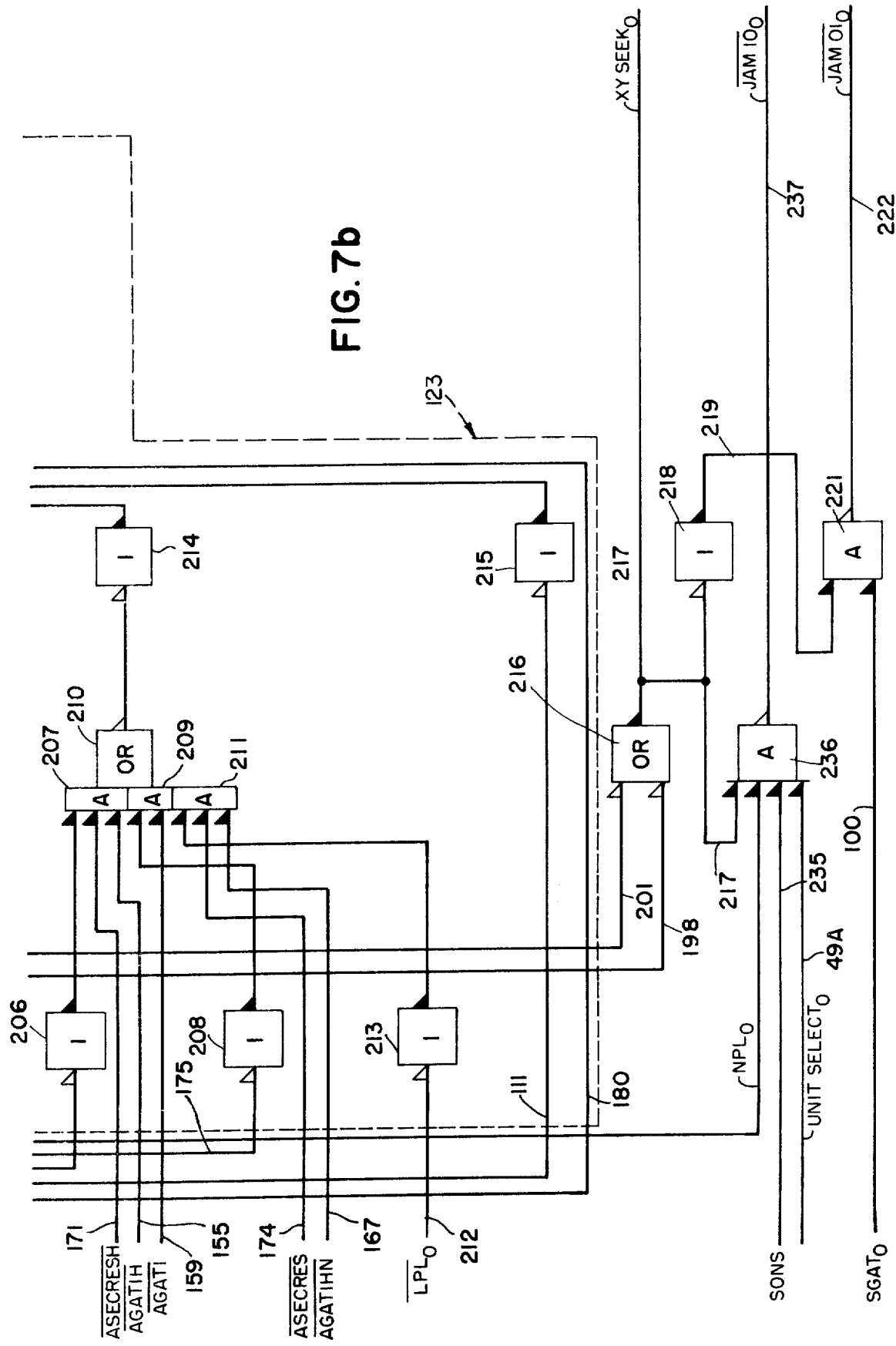

CONTROL SYSTEM FOR MAGNETIC DISC STORAGE DEVICE

BACKGROUND OF THE INVENTION

1. Field of the Invention

This invention relates to an improved control system for a mass memory storage device. More particularly, the invention relates to a new and improved control system having a control unit of the type which is operably connected between a plurality of disc storage devices and a central processing unit (CPU). The novel control system is adapted to connect one of the plurality of disc storage devices and to the CPU when the transfer of information is imminent so that both the control unit and the CPU are occupied with the task of the transfer of information for a minimum amount of time.

2. Description of the Prior Art

Most programmed data processing systems usually require a relatively large external mass memory in addition to an internal main memory. The external mass memory is usually slower and more inaccessible than the internal main memory; however, such mass memories are cheaper than high speed internal main memories. Disc storage devices offer one of the cheapest and most convenient forms of external non-destructive mass memory. One of the deficiencies with disc storage devices is that data records are recorded on a rotating disc which is only available to its read-write head once each revolution.

The average latency time required for a data record on a disc to reach a read-write head once the head is positioned over a given track is one-half revolution of the disc. If the disc storage device employs movable heads, the boom and arm supporting the head requires boom motion time. The total access time comprises latency time and boom motion time (when required). Average latency time for a disc storage device is far greater than the time to retrieve data from the main memory of the CPU. Lengthy latency time slows down the through-put or performance of the CPU.

Multiprogrammed CPU systems are capable of executing large numbers of programs of different types and operating on such programs during the same time period. Some of such programs deal with blocks of data, and other such programs may deal with individual data records. The number of programs available to the data system may be so large that portions of the program may have to be stored in the mass memory. Some programs in a multiprogrammed data processing system are more important than other programs. Similarly, some data in mass memory is more important to operating the programs than other data. The importance of the program and the individual data may or may not be related to the amount of time required to complete a given program. Heretofore, the importance of the program or data was not related to the amount of time required to locate a particular data record.

The need to reduce the access time of a rotating disc or drum has long been recognized, and some advance prior art systems have employed means for reducing the average access time of a memory device. One such representative prior art system generated a plurality of timed signals during each revolution of the magnetic disc and employed the signals to drive a sector counter. The output of the sector counter produced a count indicative of the sector which was under the read-write head. This sector count was compared with the contents of a register which contained the desired sector address, and upon coincidence-comparison, the control unit initiated a signal which resulted in a request for the CPU to transfer data.

U.S. Pat. No. 3,629,860 discloses a control unit in which the sector address is stored in a look-up table. When the CPU program of this system attempted to locate a data record in the disc storage device, the sector address associated with the date record was transferred to a sector register in the control unit, thus, tying up the control unit. In an alternative mode of operation suggested in this prior art system, the sector counter was scanned by the CPU to determine which data storage device had the least latency time, thus, tying up the control unit and the CPU. This prior art system also suggested that the sector counter may be used as a record address which changes at the time the sector counter changes count so that individual data records or bulk records may be written after the occurrence of the sector count. This use of the sector counter would be wasteful of space for individual records and could present operational difficulties due to variations in turn-around time.

The aforementioned prior art systems require that the CPU initially transfer cylinder and track address data to the control unit and at some later time transfer sector address data to the same control unit. In large systems, the sector address is obtained through a look-up table. Such prior art systems tie up the CPU during look-up, transfer or arithmetic computations.

Prior art systems which have employed sector counters have generated a coincidence signal at the time the sector count equaled the address in the sector register. The coincidence signal of such a system was processed as a request for the transfer of data. The prior art systems could easily create the request for transfer of data too late to allow for turn around time of the control unit and CPU, especially when the data record straddled a sector count.

Prior art multiprogrammed CPU systems did not include means for automatically queueing or prioritizing programs. Heretofore, an executive or master program would select a program and operate on it to the exclusion of other programs. The master or executive program could also select a subprogram which was capable of examining data, and as a result of the examination could select the program which was most important on the basis of the data examined. In other prior art systems, the individual disc storage devices or control units could be wired so that they would become operably connected to the CPU in a preselected order.

Prior art control units for disc storage devices have been effective to reduce the average latency time required to locate a data record to less than one half the time required for a disc to complete one revolution, but have not effectively reduced the time the control unit and the CPU are occupied with producing, modifying and transferring addresses related to locating data records prior to the transmission of data. Prior art control units have not been provided with programmable automatic priority control means.

SUMMARY OF THE INVENTION

It is a general object of the present invention to provide a new and improved control system for a plurality of disc storage devices which minimizes the time the central processing unit is operationally connected to the control system.

Another general object of the present invention is to provide a control system having means for assigning a priority to each seek operation for a data record so that records of highest priority will be processed by the CPU before data records of lower priority.

It is another object of the present invention to provide a control unit having a novel unit logic controller connected to each disc storage device.

It is another object of the present invention to provide an improved control system having angular positioning and priority control registers associated with each disc storage device and which may be set by an instruction from the central processing unit.

It is another object of the present invention to provide a sector register for storing the angular position of the recording medium of the disc storage device at the time of a successful completion of one of several possible search commands. Thus, the storing of the angular sector position may be accomplished before a data record is available to the read-write head, and the sector value may be retrieved at a later time.

It is another object of the present invention to provide means for determining the sector address for a data record in the disc storage device.

It is another object of the present invention to provide a novel unit logic controller having an angular positioning reserve register with each disc storage device for suppressing signals from other disc storage devices which may have lower priority seek operations in progress.

It is another object of the present invention to provide gating means for determining which disc storage device had the highest priority during the time interval immediately preceding the availability of the data record being sought by the central processing unit.

In accordance with these and other objects of the present invention, there is provided a novel control system which includes a control unit for operably connecting one of a plurality of disc storage devices to a CPU. Each disc storage device is provided with a novel unit logic controller for receiving and storing sector address information, sector reserve information and priority designation information when a seek operation is issued by the CPU. The unit logic controller is operable to indicate its priority designation and the angular sector position of its associated disc storage device. Each unit logic controller becomes operable through gating means to alert the control unit of the control system that its disc storage device has available near its read-write head a data record which is being sought by a program of the CPU. When more than one unit logic controller becomes operable and attempts to alert the control unit that its disc storage device is available to transfer data, the gating means supresses all of the alert signals except the signals originating at the disc storage device having the highest assigned priority. In the event that alert signals of equal priority are raised simultaneously, an arbitrary numerical selection of one of the disc storage devices is made.

A detailed description of a preferred embodiment of the present invention will be given hereinafter with reference to the attached drawings, in which:

FIGS. 4 to 7 (including FIGS. 72 and 76) are logical gating circuits associated with the unit logic controllers and the angular positioning and priority control logic.

DESCRIPTION OF THE PREFERRED EMBODIMENT

Figure 1:
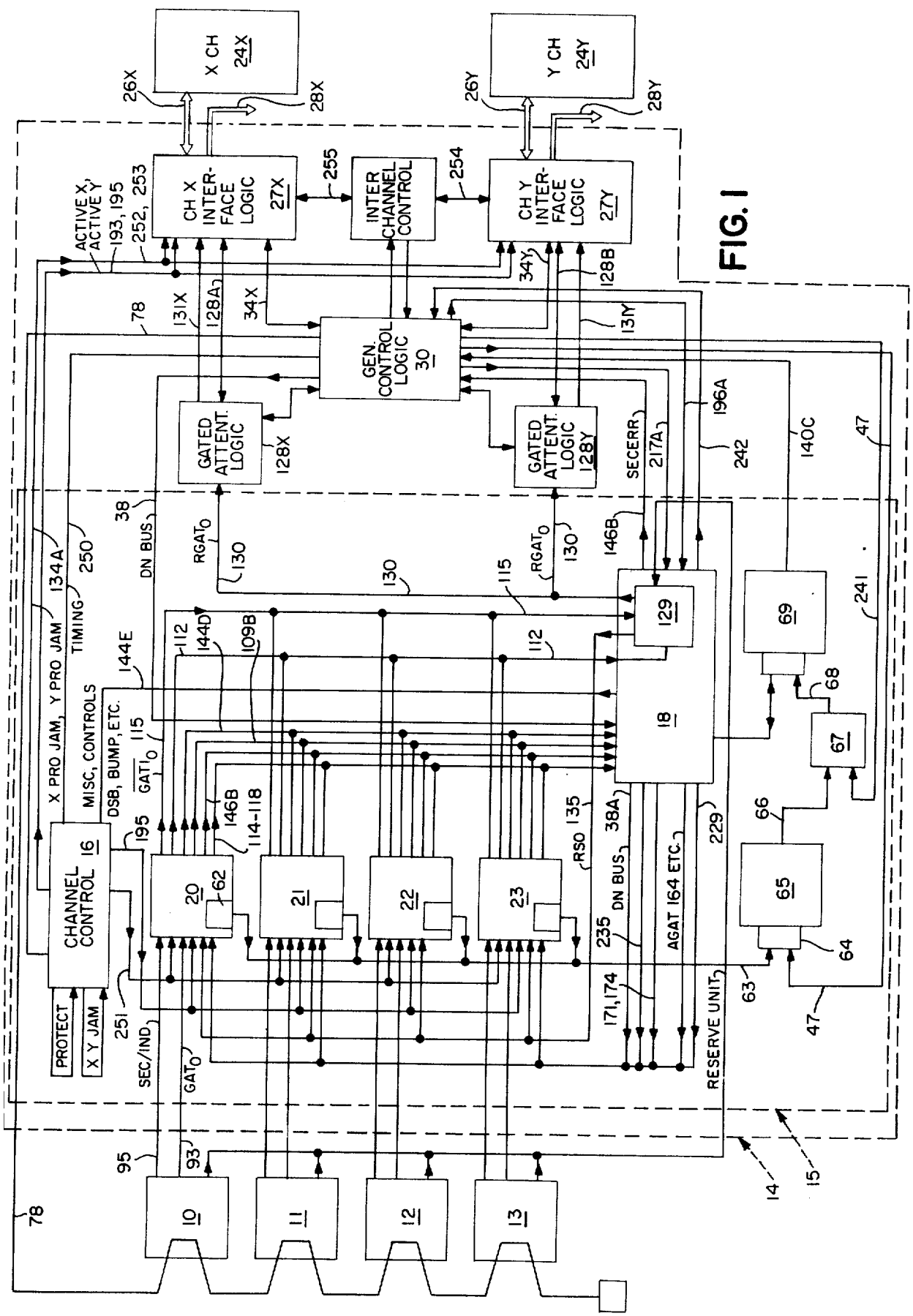
FIG. 1 is a block diagram of a data processing system adapted to illustrate the novel control system of the present invention.

Refer now to FIG. 1 which shows a preferred embodiment control system. A large number of disc storage devices such as the disc storage devices 10, 11, 12 and 13, each having an associated unit logic controller 20 to 23 respectively, are shown operably connected to the control system or control unit 14 embraced within rectangle numbered 14. The portion of the control unit 14 within the rectangle 15 comprises the functional blocks of the present improvement or enhancement of prior art control units for disc storage devices. Control unit 14 is one of a plurality of control units which may be connected to a central processing unit (not shown). Control unit 14 is shown connected to two channels, which may or may not be of the same central processing unit. It will be understood that each control unit is capable of supporting a plurality of disc storage devices and in turn is capable of being connected to a plurality of channels of a plurality of central processing units. X channel 24X of a central processing unit is shown connected to X channel interface logic 27X of control unit 14 by an input-output bus 26X. Y channel 24Y of a central processing unit is shown connected to Y channel interface logic 27Y of control unit 14 via input-output bus 26Y. It will be understood that control unit 14 may be connected to other channels of central processing units by addition of interface logic blocks similar to 27X. Further, it will be understood that channels similar to X channels and Y channels may be connected to other control units via input-output buses 28X, 28Y.

Figure 3:
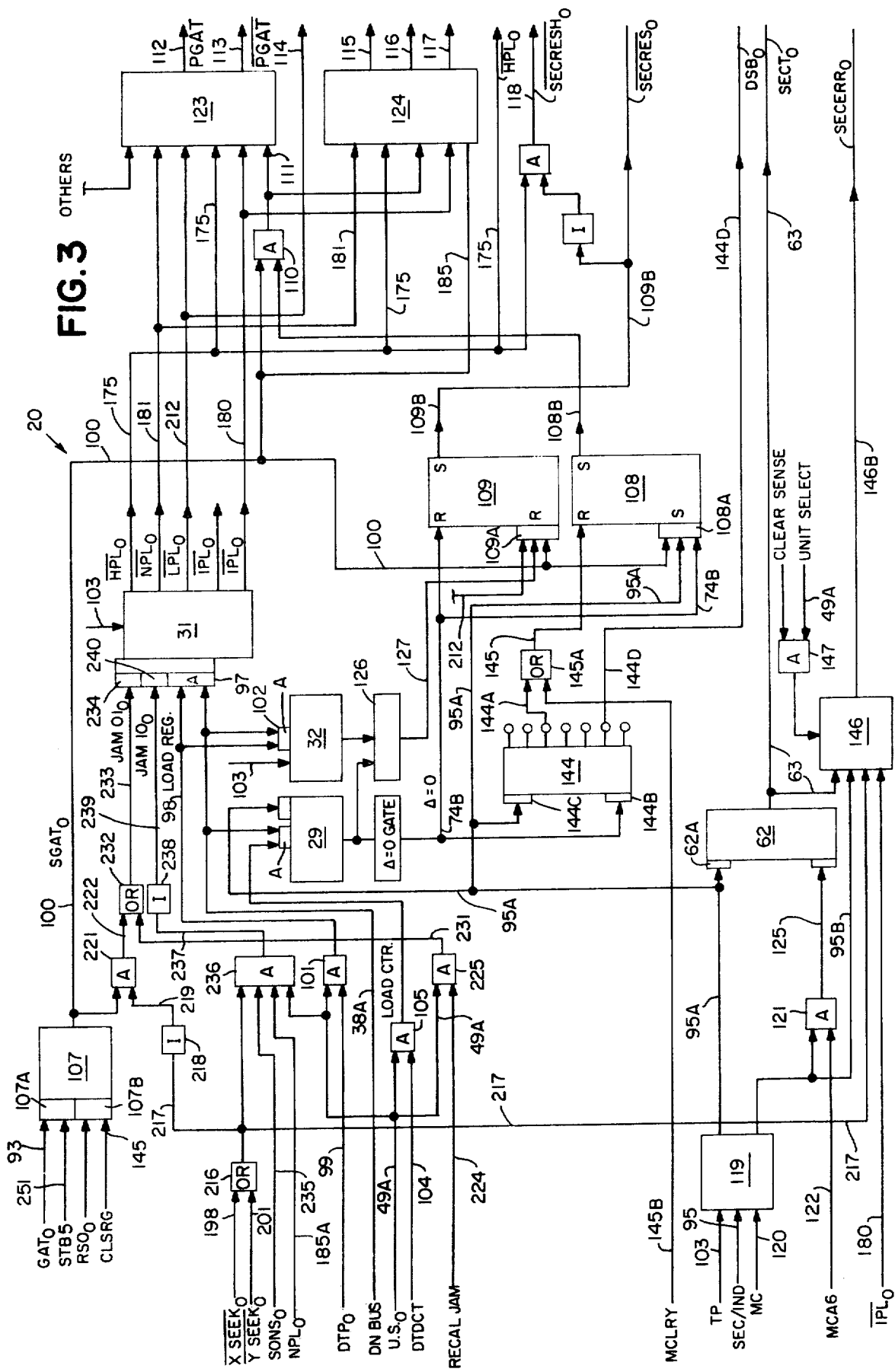
FIG. 3 is a block diagram of one of the unit logic controllers of FIGS. 1 and 2.

Refer also to FIG. 3 which shows a more detailed description of unit logic controller 20. Each unit logic controller, such as controller 20, has a delta counter 29, a priority register 31 and a reserve register 32 which are set with control and addressing information during a seek operation as will be explained hereinafter.

Before discussing the operation of the structure shown in the drawings in detail, a brief description of the chronological sequence of events which occur during an input-output operation requiring access to a record stored in device 10 will be given. More specifically, the input-output operation will comprise seek, search and read commands with a normal priority assigned to the seek command. A normal priority represents an intermediate level of available priorities storable in priority register 31 of unit logic controller 20. It will be assumed that the boom or head support carriage is so positioned that boom motion is required to locate the data record being sought.

Starting at time T-O, the X channel 24X of the CPU attempts to initiate an input-output (I/O) operation by sending out an address in bus 26X to determine the availability of the control unit 14 which controls the disc storage device having the data record being sought. The step of sending out the address is the first step of a signal sequence known as Initial Selection. Assuming that the addressed control unit is not busy, it responds to the channel of the CPU with a signal which indicates its availability, and the Initial Selection sequence continues.

At time T-1, a seek command (the first command to be executed) is sent to control unit 14 (the addressed control unit) on bus 26X.

Between times T-1 and T-2 the control unit 14 examines and stores the seek command, then examines its own status and prepares a status byte which describes the condition of the control unit and the addressed disc storage device, thus, indicating whether the addressed control unit 14 can execute the seek command. For purposes of this discussion, it is being assumed that the seek command will be executed.

At time T-2 the channel of the CPU accepts the status byte issued by the control unit 14, thus, ending the Initial Selection sequence.

Immediately following time T-2 (between times T-2 and T-3), control and addressing information is transferred to, and processed by, the control unit 14. Included in the control and addressing information are the cylinder and head addresses of the data record being sought. These addresses are stored in registers of the device 10 being addressed. In addition, other control and addressing information defining the sector address, the assigned priority and reserve number is processed by the control unit 14, and the resulting information is stored in registers of the addressed unit logic controller 20. After the control and addressing information is transferred to and processed by the control unit, the control unit 14 issues a signal, hereinafter designated as a Seek Start, which causes the addressed disc storage device 10 to begin boom motion (if required) for the seek operation.

At time T-3 the control unit 14 sends a status byte to the X channel 24X of the CPU informing the CPU that the data transfer portion of the operation is complete. Upon acceptance of this status byte, the X channel 24X of the CPU and the control unit 14 disconnect from each other. The X channel 24X of the CPU is free to perform other work, and the control unit 14 enters the idle state and is capable of performing other useful work. The I/O device 10 is busy performing boom motion.

From times T-3 to T-4 the boom motion proceeds until the cylinder address being sought is located and the desired read-write head is selected.

At time T-4, the addressed device 10 indicates it has completed boom motion, and the seek operation at the device is complete. At time T-4, the addressed device 10 raises a signal, hereinafter designated as a raw gated attention signal ($GAT_o$), indicating that the seek operation at the device 10 is complete. Unit logic controller 20 for selected device 10 is enabled by the $GAT_o$ signal which is processed into a strobed gated attention signal ($SGAT_o$) within the unit logic controller 20. The addressed unit logic controller 20 is thus primed to alert the control unit when angular positioning at the unit logic controller 20 is accomplished if priorities permit.

Between time T-4 and T-5 the addressed unit logic controller 20 is keeping a count of the sector position. A count of the position of the read-write head relative to the record being sought is kept in a sector counter 29 which will be referred to hereinafter as the delta counter 29. At time T-5 when the count in delta counter 29 becomes equal to or less than the number in the reserve register, a reserve alert signal ($\overline{SECRES_o}$) is activated and maintained until the delta counter 29 reaches zero. The reserve alert signal ($\overline{SECRES_o}$) is logically combined with the priority designation stored in the priority register 31, and the resulting signal is sent to all of the unit logic controllers 20 to 23 within the control unit 14 to supress any lower priority gated attention signals (PGAT).

At time T-6, at the end of the reserve period, when the delta counter 29 has reached zero, the read-write head is very near the record being sought. The delta counter count of zero is employed to: 1) clear the normal priority sector reserve signal ($\overline{SECRES_o}$), 2) activate a Device End alert sector gated attention signal ($\overline{SECGAT_o}$) and 3) generate the Device End alert signal which is gated with the normal priority signal in the priority register to generate a priority related Device End alert gated attention signal ($GATIHN_o$). The $\overline{SECGAT_o}$ signal attempts to activate a $PGAT_o$ signal of the unit logic controller 20. If a check of the priority gating means network indicates that no high priority reserve signal and no inactive and no high priority gated attention (PGAT) signals are active in the control unit system, the normal priority $PGAT_o$ signal at unit logic controller 20 will be activated. If this $PGAT_o$ signal is activated, and it is the highest priority signal currently active, the control unit will process it and generate a Device End status byte informing the channel of the CPU that the seek operation initiated at the disc storage device 10 has ended.

From time T-6 to time T-9 the $\overline{SECGAT_o}$ and $PGAT_o$ signals are active and are being processed in the control unit.

At time T-7 the $PGAT_o$ signal from the highest priority unit logic controller 20 is recognized by the control unit 14 and an $RGAT_o$ signal is generated. The $RGAT_o$ signal is encoded into a device address indicative of device 10, and the control unit generates the aforementioned Device End status byte informing the X channel 24X of the CPU that the seek operation is now complete.

From time T-7 to T-8 an encoded device address is being loaded into the unit registers 33X, 33Y of the control unit 14. While the unit registers are being loaded, the control unit 14 will return a busy signal to any Initial Selection Sequence (probe) from the channels.

At time T-8 the unit registers 33X, 33Y are loaded with an encoded device address, and the control unit 14 is primed to provide a period of device address protection from time T-8 to T-10.

During this period, channel (program) initiated sequences to all addresses, except the address stored in the unit registers 33X, 33Y are rejected. Also, at time T-8 the Device End status which was generated at time T-7 is now presented to the X channel 24X which initiated the seek operation.

At time T-9 the X channel 24X accepts the Device End status and the aforementioned $SECGAT_o$, $PGAT_o$, and $RGAT_o$ signals are cleared in the control unit.

At time T-10, the X channel 24X (program) responds to the Device End status by fetching the next input-output command in the program for the active device address and by presenting the command to the control unit 14. This response by the channel, which is typically a search command for the desired record, ends the previously described device address protection which was active from T-8 to T-10.

From times T-10 to T-11, the control unit 14 is executing the search command. Since the delta count of zero was planned to occur when the read-write head is very near the record being sought, there is little time wasted in searching for the record.

At time T-11, the control unit 14 indicates the successful completion of the search, command by means of an appropriate end status byte. The X channel 24X responds to the end status byte by presenting the next command, which for this explanation was assummed to be a read command.

At time T-12, the control unit 14 indicates the successful completion of the read command by an appropriate end status byte. The X channel 24X and the control unit are now free to perform other useful work.

Figure 2A:
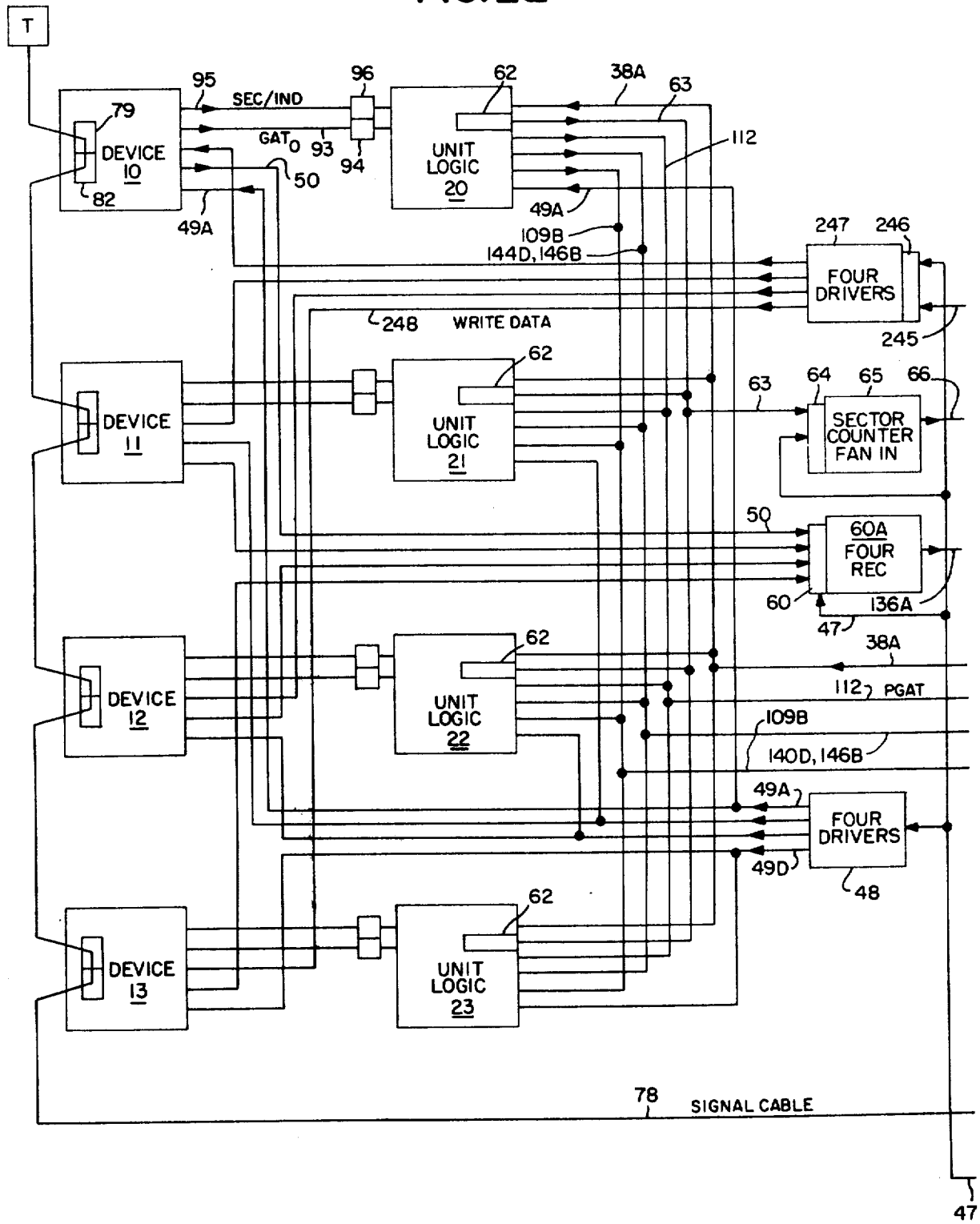
FIG. 2 (comprising FIGS. 2a, 2c and 2d) is a block diagram of the data processing system of FIG. 1 adapted to illustrate details of the control system.
Figure 2D:
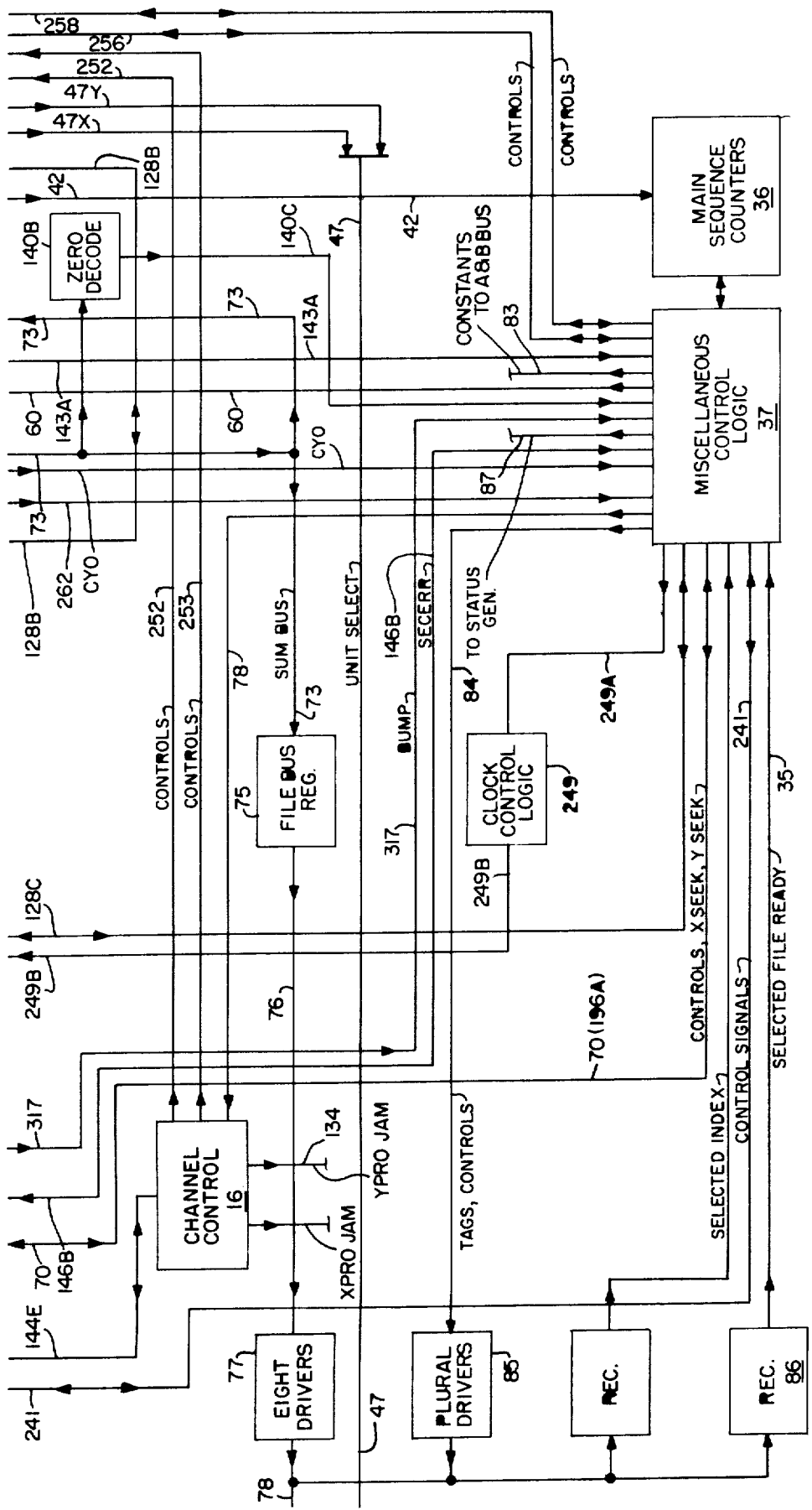

Having briefly explained the sequences of events of an input-output operation, a more detailed description of the drawings follows:

Refer now to FIGS. 1 to 3 showing a preferred embodiment control system. At time T-0 X channel 24X of the CPU initiates an Initial Selection sequence. The program information necessary to perform seek, search and read commands is stored in the main memory of the CPU (not shown) and made available to X channel 24X of the CPU. The Initial Selection sequence for the seek command causes the address of the control unit 14 and the I/O device 10 to be transmitted on cables in buses 26X and 28X to the X channel interface logic 27X of each of the connected control units (such as control unit 14). The logic circuits of X channel interface logic 27X of the control unit 14 compare the address sent by the X channel 24X with assigned addresses in the control unit 14.

A selection signal, which originates at the X channel 24X, passes serially through all attached control units, is blocked by the control unit having the assigned address matching the address on the buses 26X and 28X. Control unit 14 of FIG. 1 blocks the propagation of the selection signal and becomes selected by activating an inbound control indicating its availability to the X channel 24X. The X channel interface logic 27X of the selected control unit 14, in conjunction with signals from the general control logic 30 and signals on the bus 26X, causes the device address portion of the address on bus 26X to be loaded into the unit register 33X. Control unit 14 sends its address (containing both control unit and device identification) to X channel 24X, to be checked by the channel. If this address agrees with the address which was placed on the bus 26X by X channel 24X, the Initial Selection sequence continues.

At time T-1, assuming the return of the proper address by the control unit 14, X channel 24X issues a seek command (the command to be executed) on bus 26X. Between times T-1 and T-2 control unit 14 examines and stores the seek command, then indicates that it has received the command and prepares to return a status byte of information to channel 24X. When the control unit 14 can execute the seek command, the status byte which is returned to X channel 24X indicates that the control unit 10 is clear of error and unusual conditions and indicates that the addressed I/O device 10 has raised a Selected File Ready signal on line 35 at miscellaneous control logic 37.

At time T-2 X channel 24X accepts the status byte issued by the control unit 14 ending the Initial Selection sequence. X channel 24X will proceed with the transfer of data after acknowledging the status byte. Starting at time T-2 and up to time T-3 control and addressing information is transferred from X channel 24X to control unit 14. During the data transfer portion of the execution of the seek command, control unit 14 makes requests for six control and addressing information bytes. The six bytes, containing the priority designation, the angular address, cylinder and head addresses and other important information, are transferred to control unit 14 via buses 26X and 34X.

The control and addressing information is placed on the DN bus 38 and transferred to the angular positioning and priority control logic 18 where it is processed and sychrnoized and passed from control logic 18 to the unit logic controllers 20 to 23 via extension of DN bus 38A.

Refer now to FIG. 2 showing the X channel interface logic 27X and unit register 33X. The first of six bytes of control and addressing information leaves the channel interface logic 27X via C bus out 39X and is routed through C bus fan in 41 and bus 42 to the input of register Q-1 of the four byte queue. The bytes which follow are sequenced into register Q-1 as the previous bytes are stepped through registers Q-2 to Q-4 under control of the miscellaneous control logic 37 and the main sequence counters 36 until the four byte queue is full. After four bytes are entered into the Q-1 to Q-4 registers, the first byte, or priority control byte, which is now in the Q-4 register is transmitted from the Q-4 register to the DN bus 38 via buses 43 to 45 and DN bus fan in 46. The priority control byte in the Q-4 register is transferred to unit logic controller 20 via the DN bus 38A. After the first byte has been transferred out of the Q-4 register, the remaining three bytes in the Q-1, Q-2, Q-3 registers are shifted up as fast as possible leaving the Q-1 register empty. The miscellaneous control logic 37 senses that the Q-1 register is empty and is informed that six bytes are to be transferred for the seek operation; accordingly, the general control logic requests the fifth byte. The process is repeated when the second byte is transferred out of the Q-4 register.

The first byte or priority control byte information is employed to set both the priority register 31 and the reserve register 32 (best shown in detail in FIG. 3). The DN bus 38 is shown on FIGS. 1 and 2 passing through the angular positioning and priority control logic 18 before being connected to all of the unit logic controllers 20 to 23. The unit logic controller 20 to be set by the priority control byte information is designated by the device address in the unit register 33X by means of the unit select lines 47X, 47. The active signal on unit select line 47 will be amplified in one of a plurality of drivers 48 and connected to a unique unit select line 49A which serves as an enabling signal to the unit logic controller 20 and disc storage device 10 designated by the address information in the unit register 27A.

After the first byte or priority control byte is transferred from the Q-4 register to the unit logic controller 20, the second or angular address byte, which was sequenced up to the Q-3 register, is now sequenced to the Q-4 register is transferred on buses 43, 44 to D bus fan in 51, then to D bus 52 and is stored in status register 53. The output of status register 53 is presented via bus 50 to the input of A bus fan in 56. The output of A bus fan in 56 is fed on bus 57 through true of complement (T/C) logic 58 to bus 59 and is sequenced through the A side of adder 61. At the same time the angular address from the Q-4 register is being entered into the A side of adder 61, the B side of adder 61 receives signals from sector counter 62. Sector counter 62 in unit logic controller 20 is constantly presenting a count signal on line 63 which is gated via gate 64 into sector counter fan in 65. The output of sector counter fan in 65 is fed on line 66 to sector latch 67 and presented on output line 68 to B bus fan in 69. The output of B bus fan in 59 is fed through true or complement logic 71 and fed into the B side of the adder 61 via line 72. A carry-in on line 60 is generated at the miscellaneous control logic 37 under the control of a signal on line 70 from angular positioning and priority control 18. Adder 61 performs an arithmetic computation, which will be explained hereinafter, and the output number of this computation is fed to the sum bus 73. The computed output number on sum bus 73 is fed back on bus 73A as input to the DN bus fan in 46 and to bus 38 where it is fed to the angular positioning and priority control logic 18. The computed number is routed to the DN bus 38A where it is fed to unit logic controller 20 under the selective control of the signal on the unit select line 47 which has been amplified in one of the drivers 48 and presented on the enable lines 49A to selectively enable unit logic controller 20. The computed number is stored in the delta counter 29, as will be explained with reference to FIG. 3, and is indicative of the number of sectors existing between the current angular position of the disc of the selected device 10 and the interrupt point (delta equals zero) specified by the program in the second control and addressing information byte.

The third control and addressing information byte which was originally in register Q-2 has been stepped or sequenced up to register Q-4 for presentation to the control unit. This third byte is the cylinder address byte and when presented to the Q-4 register is fed via buses 43, 44 to the D bus fan in 51 and on to D bus 52 where it is fed into the status register 53 and stored. Information formerly stored in the status register 53 is erased when the register is jammed with new information. The cylinder address information in status register 53 is fed via line 50 to A bus fan in 56. The output of A bus fan in 56 on line 57 is fed through the true or complement logic 58 to line 59 and through the A side of the adder 61 to sum bus 73. Information on sum bus 73 is stored in file bus register 75 in parallel array. The parallel output of register 75 is presented on file bus 76 to the drivers 77 which supply a plurality of lines in signal cable 78. The information on signal cable 78 is supplied to all disc storage devices 10 to 13. Devices 10 will be enabled to receive the cylinder address when the unit select lines 47 supplying drivers 48 activates the enable line 49A which selects device 10 corresponding to the device address stored in the unit register 33X. The cylinder address is stored in cylinder address register 79 which is part of the movable head locating system. If a multiple fixed-head type disc storage device is employed, an electronic switching operation will select the cylinder.

The fourth control and addressing information byte, which was originally in the Q-1 register, is sequenced up to the Q-4 register. This fourth byte contains an extension of the cylinder address. The first eight bit byte of the cylinder address may designate up to 256 cylinder addresses, and the least significant bit of the second cylinder address byte may define an additional 256 addresses.

The fifth byte in the six byte series is not used in the present preferred embodiment. To preserve this byte for future use, the byte is loaded with zeros and process through the four byte queue without being used.

The sixth byte is the head address which follows approximately the same path as the cylinder address. The head address leaves the X channel interface control 27X on C bus out 39X and is fed into the C bus fan in 41 where it is fed to bus 42 and to the Q-1 register. The information is sequenced up to the Q-4 register and passes via buses 43, 44 to D bus fan in 51. The head address on D bus fan in 51 is supplied to D bus 52 where it enters the status register 53 and is also stored in the head address register 81 for use during multiple track operations. The head address in status register 53 is routed via bus 50, A bus fan in 56, bus 57, true or complement logic 58, and cable 59 to the A side of adder 61. The B side of the adder is maintained at zero. The output of the adder is passed to the sum bus 73 where it is stored in parallel array in file bus register 75. The contents of the file bus register are routed from file bus 76 to drivers 77 and placed on the signal cable 78 where it is supplied to all input-output devices 10 to 13. During this same time period the unit register 33X is supplying a signal on unit select line 47X which appears on the unit select line 47 and is amplified in the drivers 48 to provide an enable signal on line 49A for selection of input-output device 10. The enabled input-output device 10 accepts and stores the head address in the device head address register 82. After the cylinder address register 79 and device head address register 82 are loaded in the selected input-output device 10, the miscellaneous control logic 37 initiates a Seek-Start which is effective to cause the selected I/O device 10 to initiate movement of the head supporting carriage or boom.

Three of the signals necessary to complete the Seek Start are a file bus constant signal, a control tag signal and a unit select signal. The file bus constant signal is generated by miscellaneous control logic 37 on line 83. The file bus constant signal received on line 83 at fan in 54 is routed to A bus fan in 56 via bus 55. The output on cable 57 passes through true complement logic 58, but 59 and the A side of adder 61 to sum bus 73. The constant signal on bus 73 is routed through file bus register 75, file bus 76, driver 77, signal cable 78 and is applied to I/O device 10.

The control tag (tag 0) signal is generated by miscellaneous control logic 37 on line 84 and applied to one of the drivers 85. The control signal from one of the drivers 85 is routed on signal cable 78 to the selected I/O device 10.

The unit select signal is generated by unit register 33X on line 47X and passed along line 47 to drivers 48. One of the drivers 48 raises the unit select signal on line 49A to enable I/O device 10.

After the initiation of the Seek Start and the start of boom motion, the Selected File Ready signal, which is being presented from device 10 on signal cable 78 to receive 86 and via line 35 to the miscellaneous control logic 37, is dropped. This informs the control logic 37 that the I/O device 10 is busy occupied with boom motion processing the seek operation. At time T-3, after the Selected File Ready signal is dropped, the miscellaneous control logic 37 proceeds to the next sequence of the seek operation. The control unit 14 is aware that is has received and processed all the control information for the seek operation from the X channel 24X and it has issued a Seek Start. The miscellaneous control logic 37 via line 87 causes the status generator 88 to present a channel end status constant to fan in 54 and to the A bus fan in 56 via bus 55. The output of A bus fan in 56 on cable 57 is routed through true complement logic 58 onto A bus output 89 and to D bus fan in 51. The output of D bus fan in 51 on D bus 52 is set into status register 53. The channel end status information in status register 53 is routed on line 50A to D-IN fan in 91 and from D-IN bus 92 to channel interface control 27X and via bus 26X to X channel 24X. X channel 24X acknowledges and accepts the channel end status on bus 26X, and channel interface control 27X alerts the miscellaneous control logic 37 via control bus 258A. Upon acceptance of the channel end status control unit 14, control unit 14 goes into the idle state freeing control unit 14 and X channel 24X for other work.

From times T-3 to T-4 the I/O device 10 is busy completing its boom motion and is disconnected from the control unit 14 and the X channel 24X.

At time T-4 at the end of the boom motion, the addressed I/O device indicates that the seek operation at the I/O device 10 is complete and activates its raw gated attention signal (seek complete) $GAT_o$ on line 93 which is amplified through receiver 94 and supplied to the unit logic controller 20. The I/O device 10 is generating a sector/index pulse train one line 95, which is amplified by receiver 96 and processed by the unit logic controller 20 into separate sector pulses and index pulses to enable the unit logic controller 20 to be synchronized with the rotation of the spindle of the I/O device 10. FIGS. 1 to 3 show the seek complete signal $GAT_o$ on line 93 and the sector/index pulse train on line 95 being supplied to unit logic controller 20.

Before explaining how the seek complete signal $GAT_o$ is employed to activate unit logic controller 20 shown in FIG. 3, a review of how the previously mentioned first and second bytes of the control and addressing information were employed and processed to set data in the registers and counters of the unit logic controller 20 (before boom motion and before the $GAT_o$ signal was generated) is in order. It was assumed that a seek operation was in process and the priority assigned to that operation was a normal priority. The device 10 and its associated unit logic controller 20 have been selected (addressed) during that seek operation. The first byte of the control and addressing information comprises eight bits of which the most significant two bits contain the priority designation and the five least significant bits contain reserve information. The priority bits were set into priority register 31 via the DN buses 38, 38A and AND gate 97. The enabling load registers signal on line 98 was generated by a unit select signal $US_o$ on bus 49A and a D bus to priority signal DTP on line 99 occurring at AND gate 101. The reserve information bits were set into reserve register 32 via the DN bus and AND gate 102 which was enabled by the load registers signal on line 98. Registers 31 and 32 were further enabled by timing pulses TP on line 103.

The second byte of control and addressing information was processed in adder 61 of the control unit 14 to provide a computed number which has been supplied to the unit logic controller 20. Delta counter 29 was set with the computed number via DN bus 38A and was enabled by a unit select signal $US_o$ on bus 49A and a D bus to delta counter signal DTDCT applied via line 104 to gate 105. The computed number set in delta counter 29 was calculated from the then current sector position of the disc as presented by sector counter 62 and the sector address being sought which was present from the Q-4 register of control unit 14. The then current sector position was complemented in true complement block 71 as it entered the B side of adder 61 (FIG. 2). The program specified sector address being sought entered the A side of adder 61. A carry-in on line 60 was added. The adder output (the previously mentioned computed number) was set in delta counter 29 and was thereafter decremented to zero by signals generated by the leading edges of the synhcronous pulses on line 95A. When the delta counter 29 indicates the count of zero, the leading edge of the program specified sector address is at the read-write heads.

As long as the number of the sectors of the disc can be represented by $2^n$ (where n is an interger), the n lower order bits of the computed numer can be used to find the number of sector leading edges between the current angular sector position of the spindle of the selected I/O device and the leading edge of the sector specified by the program. The remaining higher order bits of the computed number are not required to define the number of sectors between the current angular sector position and the program specified sector address and are ignored. It will be understood that other computational methods may be employed in the adder to determine the computed number to be set in the delta counter 74 and would be employed if the number of sectors on the disc were not representative of an integral power of two.

The priority register 31, reserve register 32 and delta counter 74 were set between times T-2 and T-3 with the aforementioned values at the time the two control and addressing information bytes were processed by the control unit 14. The unit logic controller 20 is capable of indicating to the control unit 14 its designated priority and the desired angular position after its output lines have been activated by the $GAT_o$ signal which is generated at time T-4 after the completion of boom motion.

At time T-4, as previously mentioned, the addressed device 10 raises a raw gated attention signal $GAT_o$ on the 93 which is an indication from the data storage device 10 that boom motion is complete. The $GAT_o$ signal and timing pulses STB5 are applied to the $SGAT_o$ flip-flop and logic block 107 to produce a strobed gated attention signal $SGAT_o$ on line 100 indicating that boom motion is complete and the strobe pulses have activated the unit logic controller 20. The addressed unit logic controller 20 is primed to alert control unit 14 when angular positioning is complete. The $SGAT_o$ signal on line 100 is employed as an enabling input signal to AND gates 108A and 109A at the set side of device end alert flip-flop 108 and sector reserve flip-flop 109 respectively. The $SGAT_o$ signal also enables AND gate 110 which generates the device end alert signal $\overline{SECGAT_o}$ on line 111. The $\overline{SECGAT_o}$ signal enables output lines 112 to 117 from the unit logic controller to the control unit 14 at the time the desired sector address is near the read-write head of device 10.

Between times T-4 and T-5 unit logic controller 20 is maintaining a count of the position of the read-write head relative to the record being sought as well as a sector position count. Both decrementing delta counter 29 and incrementing sector counter 62 (which indicates the actual sector number at the read-write head) are stepped by pulses on line 95A which are generated by the synchronous sector index logic 119 from basic timing pulses TP on line 103, sector/index pulses on line 95 and machine clock pulses MC on line 120.

The sector/index pulses on line 95 include a unique index pulse which occurs once each revolution of the disc. A unique synchronous index pulse is generated on line 95B and gated at AND gate 121 with an MCA6 pulse on line 122 to provide a clear signal on line 125. Sector counter 62 is reset or cleared once each revolution, and the count is started again from zero by synchronous sector pulses on line 95A. When the delta counter 29 counts down to zero, the next count steps the delta counter to the highest count to start the count down again rather than being cleared. As the disc of the storage device rotates, the delta counter 29 is being counted down until it reaches zero (delta equals zero) at the program defined interrupt point. The interrupt point is as close as possible to the sector address which contains the data being sought to allow the system to process the interrupt and issue the next instruction before the data record being sought arrives under the read-write head. If the system does not process the interrupt, the circuits of the unit logic controller 20 will terminate the device end alert signal $\overline{SECGAT}$ on line 111 after a selectable period of time. The device end alert signal on line 111 may be raised again after one revolution of the disc.

At time T-5, before reaching the count of delta equals zero, the delta counter 29 will reach a count equal to or less than the number corresponding to the five bits stored in the reserve register 32. The outputs of delta counter 29 and reserve register 32 are compared in comparator 126, and when the abovementioned condition occurs, a signal is continuously presented on line 127 as long as the delta counter number is equal to or less than the five bit reserve count. The signal on line 127 is applied to AND gate 109A along with the aforementioned $SGAT_o$ signal on line 100, the synhcronous sector pulse on line 95A and a low active signal $\overline{LPL_o}$ which indicates the absence of a low priority condition. Since it is not desired to activate the sector reserve when a low priority condition exists, the absence of a low priority is used as an enabling signal to sector reserve flip-flop 109. At time T-5, when all of the enabling input conditions at AND gate 109A exist, flip-flop 109 is set and produces a low active sector reserve signal $\overline{SECRES_o}$ on line 109B which is effective to supress PGAT signals from other unit logic controllers assigned low priorities.

At time T-6 the normal priority reserve period ends as the delta counter 29 reaches the count of delta equals zero. The delta equals zero signal on line 74B is employed to reset flip-flop 109 which terminates the low active reserve alert signal $\overline{SECRES_o}$ on line 109B. At time T-6 the delta equals zero signal on line 74B is applied to AND gate 108A. The position satisfied signal $SGAT_o$ on line 100 and a synchronous sector pulse on line 95A are also applied to AND gate 108A to set device end alert flip-flop 108. The set side of flip-flop 108 produces an output on line 109B which is gated with the $SGAT_o$ signal at AND gate 110 to produce a low active device end alert signal $\overline{SECGAT_o}$ on line 111 which is supplied to logic gates 123 and 124, thus, enabling them at time T-6 when delta equals zero. The $\overline{SECGAT_o}$ signal is combined with other signals in gate 124 to inform the priority network that a normal priority device end alert signal is active and activates the high active $GATIHN_o$ signal on line 117. When a check of the priority network indicates that no higher priority reserve signal and no inactive or high priority gated attention signals are active in the control unit 14 system, the $PGAT_o$ and $\overline{PGAT_o}$ signals are activated at the output of gate 123 on lines 112 and 113. The manner in which the device end alert signal $\overline{SECGAT_o}$ and the priority related device end alert signal $\overline{GATIHN_o}$ are processed in gates 123 and 124 to produce the outputs shown in FIG. 3 will be explained in greater detial hereinafter.

The $PGAT_o$ signal on line 112 (shown in FIGS. 1 and 2) which leaves unit logic controller 20, enters the angular positioning and priority control logic 18. The generation of the $PGAT_o$ signal on line 112 requires that X channel 24X be available as indicated on line 195 from channel control 16 and that there is a seek outstanding issue from X channel 24X which is available on line 196A from general control logic 30.

At time T-7 the $PGAT_o$ signal is processed through the attention fan in boards 129 (shown in FIG. 1) of unit logic 18 and produces a unique $RGAT_o$ signal on line 130. If two or more unit logic controllers should raise a PGAT signal simultaneously, a predetermined numerical selection is effective to raise only one RGAT signal to the channel gated attention logics 128X and 128Y.

The unique $RGAT_o$ signal is processed in gated attention logic 128X and produces a set of encoded data signals indentified as XAU on line 131X under control of general control logic 30. The XAU signals define the device address for device 10. A control signal on line 128A leaving gated attention logic 128X is applied to X channel interface control 27X which is effective to cause the device address XAU signals to be entered directly into the unit register 33X. The encoded device address signals on XAU line 131X are also fed to AND gate 133 via line 132 along with a Y PROJAM signal on line 134 to cause unit register 33Y to be set with the same device address loaded in unit register 33X. The device address in the unit registers 33X and 33Y identifies the storage device which has just completed the seek operation. While the unit registers 33X and 33Y are being loaded, the control unit 14 will return a busy signal to any initial selection sequence issued by a channel.

At time T-8, the unit registers are loaded and the control unit 14 rejects any channel (program) initiated sequences to all addresses except the address which is now stored in the unit registers 33X and 33Y. The control unit 14 then presents a device end status byte to the X channel 24X, which originated the seek operation, informing the X channel 24X of the CPU that the seek operation initiated at the disc storage device 10 is complete.

The device end status signal from X channel gated attention logic 128X is presented on bus 128A to X channel interface logic 27X and to X channel 24X via bus 26X.

The control unit 14 then initiates a control unit initiated signal sequence to present status which informs the X channel 24X of its desire to communicate. During the process of establishing connection between the control unit and the channel, the control unit indicates that it is prepared to send a status byte. After the connection process has been completed, the channel examines the status byte send by the control unit and acknowledges it by means of another signal sequence. When the control unit receives the acknowledge signal sequence from the channel, the channel and control unit disconnect and the control unit initiated sequence ends. At time T-9, X channel 24X acknowledges the device end status byte on bus 26X by means of a signal sequence on bus 26X. As a result of the signal sequence, the general control logic 30 generates an XSAK signal on line 196A to angular positioning and priority control logic 18. The XSAK signal is effective to terminate the device end signal from X channel gated attention logic 128X and is effective to raise a reset seek outstanding (RSO$_o$) signal on line 135 which terminates the SGAT$_o$ signal and the PGAT$_o$, RGAT$_o$ and $\overline{\text{SECGAT}_o}$ signals are cleared.

At time T-10, X channel 24X initiates the next I/O operation addressed to the device 10 which has just presented the device end signal. Having assumed a normal priority read operation is in progress, the channel will issue a search for the desired record identification (search I.D. command). Control unit 14 will go through the initial selection sequence as has already been described between the times T-0 and T-1. After the initial selection is complete, the search for the record identification begins. The information on the recording medium disc of the disc storage device 10 is read by the read-write head and is transferred on line 49B to AND gate 60 which is enabled by the device address from unit register 33X on line 47X and the unit select signal on line 47. The output of receiver 60A is presented on line 136A to the data recovery logic 136. The information being read on line 136A is also presented to the read-write clock generator 137. The output of generator 137 is thus synchronized with the information being read from data storage device 10. Clock pulses on output line 103A are distributed throughtout the control unit 14 as TP timing pulses or bit clock pulses, and the timing pulses are supplied to bit ring counter 138 for generator machine clock (MC) pulses on line 120A used throughout control unit 14. It will be understood that read-write clock generator 137 has an oscillator which is effective to generate the timing and machine clock pulses except during reading operations. The serial information from data recovery logic 136 is presented on line 136B and fed into the shift register 139. The parallel output of shift register 139 on line 139A is fed to data register 140. The output of data register 140 on line 140A is fed directly into the B bus fan in 69 and through true of complement logic 71 to line 72 at the input of the B side of adder 61. The information being read from the disc storage device typically has more than one area of identification such as a count area and a key area as well as the address marker which occurs before the data to be read. The information to be compared with the information being read from the data storage device is entered into the A side of the adder. The address identification information which originated at the X channel 24X is transmitted on bus 26X to channel interface logic 27X and onto C bus out 39X and into C bus fan in 41. The address is routed on bus 42 to queueing register Q-1 through Q-4 and is routed on buses 43, 44 to D bus fan in 51. The output of the information on D bus 52 is routed through status register 53 to line 50 and enters A bus fan in 56. The output on line 57 is routed through true complement block 58, line 59 and into the A side of adder 61. The information entering the A side of the adder and the B side of the adder is compared byte by byte. the result of this adder comparison is presented on bus 73 to zero decode logic 140B. The adder carry out line CYO presents the carry out signal directly to logic 37. The decoded output of the byte by byte comparison on line 140C and the carry out output are presented to miscellaneous control logic 37 where they are stored in a flip-flop storage (not shown). The flip-flop storage maintains an up dated record of the byte by byte comparison which is examined until the record address ends. Logic circuits (not shown) determine if the data compared were the same or different.

At the time T-11, when all of the bytes have been examined, the miscellaneous control logic 37 generates a status byte on line 87 which is applied to status generator 88. The output of status generator 88 is applied to fan in 54 and via line 55 to A bus fan in 56. The coincidence status is routed on line 57 through true complement logic 58 on to A bus 89 and to D bus fan in 51. The coincidence status on D bus 52 is employed to jam status register 53 with the status. The status stored in status register 53 is routed on line 50A to D-IN fan in 91 and on to D-IN bus 92 where it is entered directly into X channel interface control 27X. For the read operation being explained, the search criteria requires that the record identification being sought is equal to the identification being read from the disc. When the comparison is successful, the control unit indicates this to the channel by a status byte containing status modifier, channel end, and device and status bits. If the comparison is not successful as is the case when a record in advance of the record being sought is read, there would be a channel end and a device end without the status modifier which would cause the channel to proceed and reissue the search command so that the device reads the next record and searches through the information in order to get a proper successful comparison. After the successful comparison is made, the next command from X channel 24X will be a read command which begins with the aforementioned initial selection and is followed by the actual read operation. The information being read from the disc storage device 10 may have a key area before the data, and the control unit 14 will clock through the information and markers which precede the actual data. When the control unit 14 senses it is at the data area of the record, it will start reading the data. The data is transmitted on line 49B through AND gate 60, receiver 60A, line 136A, data recovery logic 136 and onto line 136B where it enters the shift register 139. The information from shift register 139 on line 139A enters data register 140 and is routed on bus 140A to the queueing registers Q-1 to Q-4. Once the Q-4 register is loaded, the control unit can request transfer of the information to X channel 24X. As explained hereinbefore, the information is shifted up and sequenced through the queueing registers and supplied directly to D-IN fan in 91 and routed on D-IN bus 92 directly to X channel interface logic 27X where it is routed via bus 26X to X channel 24X.

The length of the data record to be transferred was set in registers 141 (shown as data length register) and is transferred via fan in 54, A bus fan in 56, bus 57, T/C logic 58, buses 59, 89 and 89A to the byte counters 142, 142A. A preferred manner of operating the byte counter is to the set byte counters with data representing the desired length of record. The byte counters are then decremented as the data record is being transferred. When the counters reach zero, the zero decode logic 143 generates a signal on line 143A which informs the miscellaneous control logic 37 that the transfer of the data record is complete, thus, completing the read operation.

At time T-12, the read command has been successfully completed, and an end status byte is generated at the control unit 14 to be presented to X channel 24X to terminate the connection. The miscellaneous control logic 37 generates the end status constant which is applied via line 83 to fan in 54. The constant is routed via A bus fan-in 56, bus 57, T/C logic 58, A bus 89, D bus fan -in 51 and bus 52 to status register 53. The end status in register 53 is presented to X channel 24X via line 50A, fan-in 91, D-IN bus 92, X channel interface control 27X and bus 26X. The control unit 14 and X channel 24X are now free to do other work.

If at time T-6, unit logic controller 20 (shown in FIG. 3) had been inhibited from raising its $PGAT_o$ signal, control unit 14 would not have become occupied with processing the $RGAT_o$ signal, and X channel 24X would not have become occupied with processing the device end signal. The $PGAT_o$ signal is inhibited when the control unit 14 or X channel 24X are busy or when a higher priority device end alert signal is active. When $PGAT_o$ and $RGAT_o$ are not activated, the control 14 does not produce the aforementioned XSAK and $RSO_o$ normal termination signals; thus, the device end alert flip flop 108 which was set at time T-6 by delta equals zero signals would not be reset at time T-9. Accordingly, there is provided a secondary system or means in each unit logic controller which routinely clears the unit logic controller each revolution of the disc when processing an angular positioning device end alert signal. The secondary system comprises a delay counter 144 having a patchable output. The clear signal (CLESG) on line 145 is produced by one of the outputs from delay counter 144 on line 144A. The delay count signal is generated after X channel 24X has had time to generate a normal channel response to the signals generated at control unit 14. Sector delay counter 144 is shown having seven plug or patchable outputs representing sector counts. Sector delay counter 144 is reset to zero by a delta equals zero signal on line 74B applied at AND gate 144B. Synchronous sector pulses on line 95A are applied to AND gate 144C of the sector delay counter 144 to step the counter to its highest count. When the counter reaches its highest count, it remains frozen until the next delta equals zero signal resets the counter and initiates another count sequence. Each output line of counter 144 will become active in succession as the counter is stepped by the synchronous sector pulses on line 95A. The delay count on line 144A becomes active on the second sector count after the device end alert signal ($\overline{SECGAT_o}$) has become active. The reason for employing two sectors time delay as the timing for the CLRSG signal is to provide a reasonable length of time for the control unit to process the device end alert signal and for the channel to acknowledge the resulting device end status. For many current computer systems, one sector of time delay is insufficient time for processing the device end signals, and three sectors time delay is an excess amount of time.

When flip-flop 108 is reset by the CLRSG signal on line 145, the CLRSG signal is also applied to OR gate 107B to reset the SGAT flip-flop 107 which terminates the SGAT signal, thus, restoring unit logic controller 20 to a normal reset or ready state. Unit logic controller 20 will attempt to raise its $PGAT_o$ signal after one revolution of the disc when the read-write head has approached the data record being sought.

The CLRSG signal on line 145 may also begenerated by a manual or general clear signal (MCLRY) on line 145B via OR gate 145A such as would be generated when power is turned on or when a clear switch is activated.

Sector delay counter 144 has a second counter output line 144D for producing a drop sector busy ($DSB_o$) signal. This delay count signal usually occurs after the CLRSG signal produced on line 144A and occurs after the X channel 24X has had time to respond to the device end signal from the control unit. The $DSB_o$ signal of line 144D is employed to terminate channel protection at channel control 16. The $DSB_o$ signal on line 144D of FIG. 3 is also shown on FIG. 1 being routed to the angular positioning and priority control logic 18 where it is processed and routed to channel control 16 via line 144E to clear out the channel control 16 in preparation for the next sequence.

Once each revolution the disc storage device 10 performs a sector counter check to check for proper operation of the counter. A simple and preferred system for checking sector counter is shown in FIG. 3. The $SECT_o$ signal on line 63 provides the actual count which is representative of the number assigned to the sectors of the disc storage device 10. Sector counter 62 is stepped by synchronous sector pulses on line 95A and is cleared by the synchronous index pulse presented on line 125 once each revolution of the disc as explained hereinbefore. The count on line 63 from sector counter 62, a synchronous index pulse on line 95B, a signal representative of a seek outstanding at X channel or Y channel (X seek or Y seek) on line 217, and a signal representative of the absence of an inactive priority signal ($\overline{IPL_0}$) line 180 are applied to error check logic 146. If sector counter 62 has reached its highest count and stepped to the count of zero when the synchronous index pulse on line 95B is sensed at the error check logic, the sector count is at the correct count; however, if the sector counter 62 is not at the count of zero at the time the synchronous index pulse is applied to the error check logic 146, and before the clear signal is applied to the sector counter on line 125, the sector error logic flip-flop 146A (not shown) is set raising a SECERR signal on line 146B. Subsequently, when the angular positioning device end status byte is being presented to the channel, a unit check status bit will accompany the device end status bit if the sector error flip-flop is set. The sector error flip-flop also causes a sense bit, indicating a sector error, to be set. A unit check status bit is sent along with the device end status bit and enables the miscellaneous control logic 37 to sense the presence of a sector error on line 146B. The error check logic is reset with a unit select ($US_o$) signal on bus 49A and a clear sense signal applied to AND gate 147. Other methods may be employed to check the correctness of the count in sector counter 62. For example, a stored count may be compared with the count being presented in the sector counter, preferably at the lowest or highest count of the counter. Also, we could have checked for an overflow or carryover in the highest order of the register at the time the counter is supposed to reset itself to zero. In the preferred embodiment operation explained herein, the sector error signal is not employed until such time as the unit logic controller is attempting to present a device end status byte from the disc storage device in question.

Unit logic controllers of the type shown in FIG. 3 have their priority registers 31 set during a seek operation when the aforementioned six addressing and control information bytes are transferred from the channel of the CPU via the control unit 14. When a disc storage device, such as device 10, becomes available after being unavailable to the system, it is desirable to inform the channel (program) that the disc storage device 10 is now available without the program having to probe the device continuously. It is also desirable that the priority register be set to low priority to avoid interruption of active seek operations which could occur if an inactive or high priority were left active in the register from previous seek operations. When disc storage device 10 becomes available, it will raise its $GAT_o$ signal on line 93 which results in an $SGAT_o$ signal on line 100. When the $\overline{X\ SEEK}$ on line 198 and the $\overline{Y\ SEEK}$ on line 201 (from FIG. 7) are high, the condition indicates the absence of a seek outstanding from channels X and Y. These signals are buffered at OR gate 216, and the output on line 217 is inverted in inverter 218, and the inverted output on line 219 is applied as an enabling input to AND gate 221 with the aforementioned $SGAT_o$ signal. The $SGAT_o$ signal in the absence of a seek outstanding indicates the availability of device 10. The low active JAM $01_o$ output of AND gate 221 on line 222 is inverted at gate 232 and applied to gate 234 to set low priority ($\overline{JAM\ 01_o}$) in priority register 31. At this time the control unit 14 by means of other logic presents an attention status byte to the X channel 24X by means of the previously described control unit initiated sequence to present status.

The recalibrate operation is a type of seek command where the read write heads are directed to the zero cylinder position and the zero head is selected. The aforementioned six addressing and information bytes are not transferred from the channel in order to accomplish the recalibrate command. The cylinder and head address transmitted to the device for the recalibrate operation are all zeros. The zero addresses may be generated employing the same circuits used to load the cylinder and head address during the previously described seek between times T-1 and T-2. The zero addresses are automatically supplied on signal cable 78 via drivers 77 when no specific constants or information are presented on D Bus 52 and A Bus fan in 56. As shown in FIG. 3, the recalibrate command jam signal on line 224 is applied to AND gate 225 with a unit select zero signal from line 49A to produce an output recalibrate jam signal on line 231 which is applied to OR gate 232 to activate the aforementioned jam low priority (JAM 01) signal on line 233. The JAM 01 signal on line 233 is employed to drive gate 234 to set priority register 31 to the low priority state. The execution of the recalibrate command is similar to the execution of the aforementioned seek command. The control unit 14 performs the same sequence of operations as would be employed to set the head address, the cylinder address and the delta counter for a seek command. After the head carriage boom motion is complete, and delta equals zero signal is achieved, the device end status byte will be generated indicating the end of the operation. The next instruction to be issued from the channel of the CPU is at the discretion of the programmer.

Another feature of the present invention enables the programmer to update a normal priority to a high priority. If a normal priority seek command is outstanding and does not cause the generation of a device end within a normal time for the program to continue, the program is provided with an alternative operation wherein a seek command is issued to the same device address while the previous seek command is outstanding. The resulting seek on seek (SONS) signal on line 235 will cause the normal priority in priority register 31 to be changed to a high priority. As shown in FIG. 3, there is a SONS signal generated on line 235 which is presented to AND gate 236. The low active $\overline{X\ SEEK}$ signal on line 198 and low active $\overline{Y\ SEEK}$ signal on line 201 is buffered and inverted in gate 216 and applied to AND 236 along with a unit select $US_o$ signal on line 49A to provide the jam high priority ($\overline{JAM\ 10_o}$) signal on line 237. The $\overline{JAM\ 10_o}$ signal is inverted in inverter 238 and the JAM $10_o$ signal on line 239 is applied at gate 240 to set high priority in register 31. The high priority signal is set in priority register 31. When the second seek command was issued to the same device while the previous seek command was outstanding, a status byte containing device busy is returned to the channel. This busy signal is ignored under these circumstances. This programming tool will enable the programmer to upgrade normal priority operations which are being delayed by high priority seek operations more than the usual time that occurs with normal priority. The time period may be set by the programmer through means of a real time clock in the computer (not shown).

Each of the unit logic controllers 20 to 23 of the types shown in FIG. 3 has its own sector counter 62. The individual sector counters 62 shown in FIG. 2 present their count at the input of sector counter fan in 65. When a unit select signal ($US_o$) on line 47 is active to enable one of the unit logic controllers, there is an output from sector counter fan in 65 presented on line 66 to sector latch 67. The count set in sector latch 67 is the same count as the count in sector counter 62 of the unit logic controller associated with the storage device being addressed. Each time sector counter 62 is stepped, the sector latch 67 is presented with a new count, and the control signal on line 241 from miscellaneous control logic 37 may latch or freeze the count for one or more sector counts.

Another feature of the present invention is to provide a flexible read command which enables the sector latch 62 to be set or loaded upon a desired occurrence such as the issuing of a read sector immediate command or the successful completion of a search operation which is followed by a read sector delayed command. The read sector immediate command may be issued separately or in a command chain. Whenever the control unit detects a read sector immediate command during an initial selection sequence, the current sector number of the addressed unit logic controller is frozen into the sector latch. The sector number remains stored in the sector latch until the end of the execution of the read sector immediate command. During the execution of the read sector immediate command, the count stored in the sector latch is presented to channel; thus, the channel of the CPU may interrogate the real time position of any of the storage devices.

The alternative read sector delayed command mode of employing the sector latch is to set the latch when a search operation is successfully completed. The set of stored count remains stored in the sector latch until the end of the currently active command chain. when a read sector delayed command occurs in the command chain after the search command, the stored sector count will be transferred to the channel. A read sector delayed command which is not included in the command chain is rejected by the control unit as an improper command.

Another feature of the present invention permits the interrruption of control unit processing if the selected unit logic controller has a low priority in its priority register and a high priority device end alert signal $\overline{\text{SECGAT}}$ becomes active in another unit logic controller associated with the same control unit. As explained hereinbefore, a prerequisite for raising a PGAT signal to a desired channel is that that channel is available; thus, it will be understood that device end alert signals addressed to a busy channel are prevented from raising a PGAT signal at logic gates 123.

The angular positioning and priority control logic 18 of control unit 14 receives a plurality of signals from each of the unit logic controllers that are connected thereto. If a low priority operation is in progress between a storage device and a channel of the CPU, such as a read, write or search operation, when a high priority device end alert signal ($\overline{\text{SECGAT}}$) from another storage device becomes active, the high priority device end alert signal attempts to raise a high priority PGAT signal. The high priority PGAT signal initially cannot be raised because the control unit and the channel are busy. The angular positioning and priority control logic 18 senses the condition that there is a low priority operation in progress and that the device end attempt has associated therewith a high priority. The angular positioning and priority control logic 18 generates a bump signal on line 242 which is transmitted to the general control logic 30 and a control signal on line 144E which is transmitted to channel control 16. The general control logic 30 terminates the low priority operation in an orderly manner and proceeds to generate a special status byte which is transmitted to the currently operating X channel 24X via bus 34X informing the channel that the low priority command has been terminated by the device end alert signal of a high priority seek command. The special status byte is examined and recognized by the operating program. The control unit active signal on line 195 is terminated at the control unit 14 permitting the appropriate channel available signal XCHAV$_o$ (or YCHAV$_o$) on FIG. 7 to become active which will enable the PGAT output of the priority unit logic controller. As explained hereinbefore, when a high priority PGAT signal is generated at the high priority unit logic controller and the associated control unit and channel are available, the signal will result in a device end status byte and a connection of the channel and control unit to the device raising the high priority PGAT signal.

It will be understood that if the program which has issued the high priority seek command had established a sufficiently long sector reserve period ahead of its device end alert signal, it possibly could have prevented initiation of the low priority operation by blocking the low priority device end alert signal of the low priority seek command.

The description of a write operation is very similar to the description of the previously described read operation. The sequence of events from time T-0 to time T-11 are identical; thus, initial selection, seek and search operations are completed as described hereinbefore. After the successul search operation is completed, and a comparison is achieved identifying the proper record address, the status modifier, channel end and device end are generated as described before. The program (channel) responds with the next instruction. When the next instruction is the write data command, the initial selection sequence is initiated as explained with regard to the read operation. After the initial selection sequence is complete, the control unit will request the data to be written in the disc storage device, and the information will be stored in the queueing registers Q-1 to Q-4 via the C bus out 39X. The information to be written on the disc passes through the queueing registers Q-1 through Q-4 to lines 43, 44 into D bus fan in 51 and onto D bus 52. From D bus 52 the information passes through the write gap constants logic 243 and into the shifter 139 via line 244. The information is entered into the shifter 139 in parallel and is driven out of the shifter 139 in series on the write data line 245. When information on the write data line 245 is presented to AND gate 246, the unit select signal on line 47 is active to select one of the drivers 247 which is associated with the proper storage device in which the information is to be written. Assuming that device 13 is the selected device, one of the drivers 247 will activate write data line 248 which is an input to device 13. Device 13 is also enabled by the unit select signal on line 47 which enables one of the drivers 48 to actuate enable line 49D at the device 13. After the channel and the control unit transfer the desired information, an end status byte is generated, and the write operation is complete. At time T-12 when the write operation is complete, a signal sequence is initiated between the channel and the control unit, and the channel and the control unit disconnect from the data storage device 13 leaving them free to undertake other work.

It will be noted that the information being written passed through shifter 139 onto write data line 248 without passing through the data recovery logic 136. The informaton from shifter 139 is synchronized by read-write clock generator 137 which is being supplied with timing pulses from an internal oscillator or a similar timing clock under the control of the clock control logic 249 and miscellaneous control logic 37 via lines 249A, 249B. When the command being executed requires that data be read from the device, the read-write clock generator 137 is synchronized with the data on line 136A coming from the device. The read and search commands are the type of commands which require that data be read from the device. For all other commands, the control unit 14 clock system is synchronized with internal oscillator in the read-write clock generator 137. All commands from channels are set in register 259 and decoded in decoder 261 before being presented to miscellaneous control logic 37. Control lines 252 and 253 connecting channel control logic 16 and interface logics 27Y and 27X, control lines 254 and 255 connecting inter channel control 256 and interface logics 27X and 27Y, control line 257 connecting inter channel control 256 and miscellaneous control logic 37, and control lines 258A, 258B connecting interface logics 27X and 27Y and miscellaneous control logic 37 are active during the above commands to enable and to properly sequence the flow of data explained herein.

The seek command associated with a read write operation may have priority designations other than the normal priority designations described hereinbefore. In the preferred embodiment unit logic controller 20, shown in FIGS. 1 to 3, the priority register 31 may be set to one of four designations. The highest level is designated an inactive priority because it causes the control system to bypass the angular positioning and priority control enhancement and in operation blocks all other priorities.

The provision of an inactive priority enables the improved control system to be operated by older programs which were not specifically intended to utilize the improved control system but which operate and execute commands as if the improvement did not exist. Accordingly, another feature of the present invention permits the disc storage devices 10 to 13 to operate so as to bypass the angular positioning and priority control enhancement shown in block 15 of FIG. 1. In the improved control system the priority control byte always sets some priority in priority register 39. When the priority in register 31 associated with device 10 is an inactive priority, an indicated by zeros in the most significant two bits of the first control and addressing information byte, then the whole enhancement hardware is bypassed. The SCAT flip-flop logic 107 is blocked; thus, the output of gate 123 is blocked preventing the disc storage device having the inactive priority from raising a PGAT signal. At the same time the outputs on line 115 will supply a gated attention inactive signal $\overline{GATI_o}$ to the angular positioning and priority control logic 18 which will produce a device end to the channel (program). The $GATI_o$ signal from unit logic controller 20 is shown in FIG. 1 on line 115 entering attention fan in boards 129 where it is processed to generate an $RGAT_o$ on line 130, thus, effectively bypassing the angular positioning and priority control enhancement. It will be understood that all programs not designed for the present improved control system can be operated with the novel control system 14 operably connected between the channels of the CPU and the disc storage devices.

The remaining three priority designations, namely, high, normal and low priority comprise the designations which are related to, and which utilize, the enhancement features of the control system.

The next highest priority is designated high priority because it supresses normal and low priorities and may be blocked by an inactive priority. During its reserve period, up to delta equals zero, a high priority associated with an SGAT signal will supress the PGAT signal attempt of normal and low priority device end alert signals. After delta equals zero, the gated attention signal (GATIH) on line 116, which is associated with a high priority, will continue the supression of normal and low priority device end alert attempts to raise a PGAT signal. A high priority device end alert signal may bump or interrupt a low priority operation which is already in progress even after the unit logic controller having the low priority has raised a PGAT signal and the associated device is operably connected to a channel.

The next highest priority is designated a normal priority. During its reserve period, up to delta equals zero, a high priority associated with an SGAT signal will supress the PGAT signal attempt of a low priority device end alert signal. After delta equals zero, the gated attention signal (GATIHN) on line 117, which is asciated with a normal priority, will supress the low priority attempt to raise a PGAT signal.

The lowest priority is designated a low priority because it may be supressed by all other priorities. Should an addtional priority designation be added to the preferred embodiment system, the lowest order priority need not have a reserve period. The device end alert signal from a low priority unit logic controller is processed only when a high priority device end alert or reserve alert is not currently active and the attempt to raise its PGAT signal is not blocked by an inactive priority signal.

The manner in which a priority related PGAT signal from a unit logic controller is processed into a RGAT signal may be explained with reference to FIG. 1. General control logic 30 via line 250 causes channel control 16 to generate an STB 5 or GAT strobe signal on line 251 which is employed as an enabling input to the unit logic controllers 20 to 23. The STB 5 signal is also shown on FIG. 3 as an input to the set side of SGAT flip-flop 107 in unit logic controller 20. As explained hereinbefore, the SGAT signal on line 100 in each unit logic controller is an enabling input to the gates of the unit logic controller which generates PGAT output signals. Each unit logic controller operates synchronously to produce PGAT signals on lines 112 and 113. The PGAT signals from all unit logic controllers are processed in attention fan in boards 129. Periodically a strobe signal is generated, under control of general control logic 30, at attention fan in boards 129 until at least one PGAT signal is present at the input. If a singlle PGAT signal is active when the strobe signal occurs, the single PGAT signal has the highest priority level currently active. When several PGAT signals are active at the output of more than one unit logic controller, they have been processed by the priority gating circuits 123 and 124 and each PGAT signal is the highest level priority currently active. All PGAT signals which are active at the time of the strobe signal are sampled in a set of flip-flops (not shown) in attention fan-in boards 129. PGAT signals which are raised subsequent to the strobe signal, even though in process, are ignored until the next or subsequent sampling. Whenever one or more PGAT signals is sampled at attention fan-in boards 129, the sampling strobe signal for the set of flip-flops and the STB 5 or GAT strobe signal are turned off by a cutoff signal which is generated in the angular positioning and priority control logic 18. The cutoff signal at the attention fan-in boards 129 is also transmitted to channel control 16 via miscellaneous control line 144E causing the strobe signals to remain inactive until such time as the sampled PGAT signals result in a device end status byte which is accepted by the proper channel. Once the device end is accepted by channel, the miscellaneous control logic 18 via miscellaneous control line 144E and channel control 16 reinitiate the STB 5 signal and re-establish the periodic sampling of PGAT signals to the attention fan-in boards.

The priority lines at the output of priority register 31 are set between times T-2 and T-3 and remain set until register 31 is set with another priority. The SGAT signal which enables gate 124 is raised at time T-4 at the end of boom motion. The sector reserve alert signal $\overline{SECRES_o}$ on line 109B, when active, is set by reserve alert flip-flop 109 at time T-5. The device end alert signal $\overline{SECGAT_o}$ on line 111 which enables gate 123 is enabled by device end alert flip-flop 108 at time T-6. It will now be explained how the device end alert signal $\overline{SECGAT}$ and the priority gated attention signals are processed in gates 123 and 124 to provide priority gated attention signals PGAT.

Referring now to FIGS. 4 to 7, there are shown five sets of four input signals which are produced by the unit logic controllers 20, 21, 22 and 23. These input signals include the output signals shown on lines 109B and 115 to 118 on FIG. 3 for unit logic controller 20 designated by sub $o$ notations. Lines from unit logic controllers 21 to 23 are not separately numbered but also identifiable by sub-notations 1 to 3. Each line is also identified by letter abbreviations. The prefix A stands for "any." I, H and N in context or IPL, HPL and NPL alone stands for "inactive," "high," and "normal" priority respectively. GAT stands for "gated attention." SEC and SEEK stand for "sector" and "seek" respectively. X and Y represents the channel designation. S along or as a prefix stands for "synchronized" or "strobed." The function of the logic gates is indicated by letter designations in the blocks. I, A and OR is indicative of INVERSION, AND and OR logic functions. An open flag input to these logic gates indicates that a low level signal is required to actuate the gate and conversely the closed or solid flag indicates a high level signal actuates the gate. The opened or closed flag at the output of the gates is indicative of a low active or high active signal output respectively when the gate is activated. In the event a low active signal line is employed as an input to a gate requiring a high level signal (closed flag), the logic calls for the inactive state of the low active signal (high level) as a condition precedent for activation of the gate.

There is a high active gated attention inactive or high priority ($GATIH_o$) signal on line 116 of FIG. 4. Similar signals from other unit logic controllers are applied to gates 151. The inverted output low active $\overline{GATIH}$ signals are buffered at OR gate 152 to produce a high active any gated attention inative or high priority ($\overline{AGATIH}$) signal on line 153 from any low active input. The $\overline{AGATIH}$ signal on line 153 is inverted at inverter 154 producing a AGATIH signal on line 155.

Figure 6:
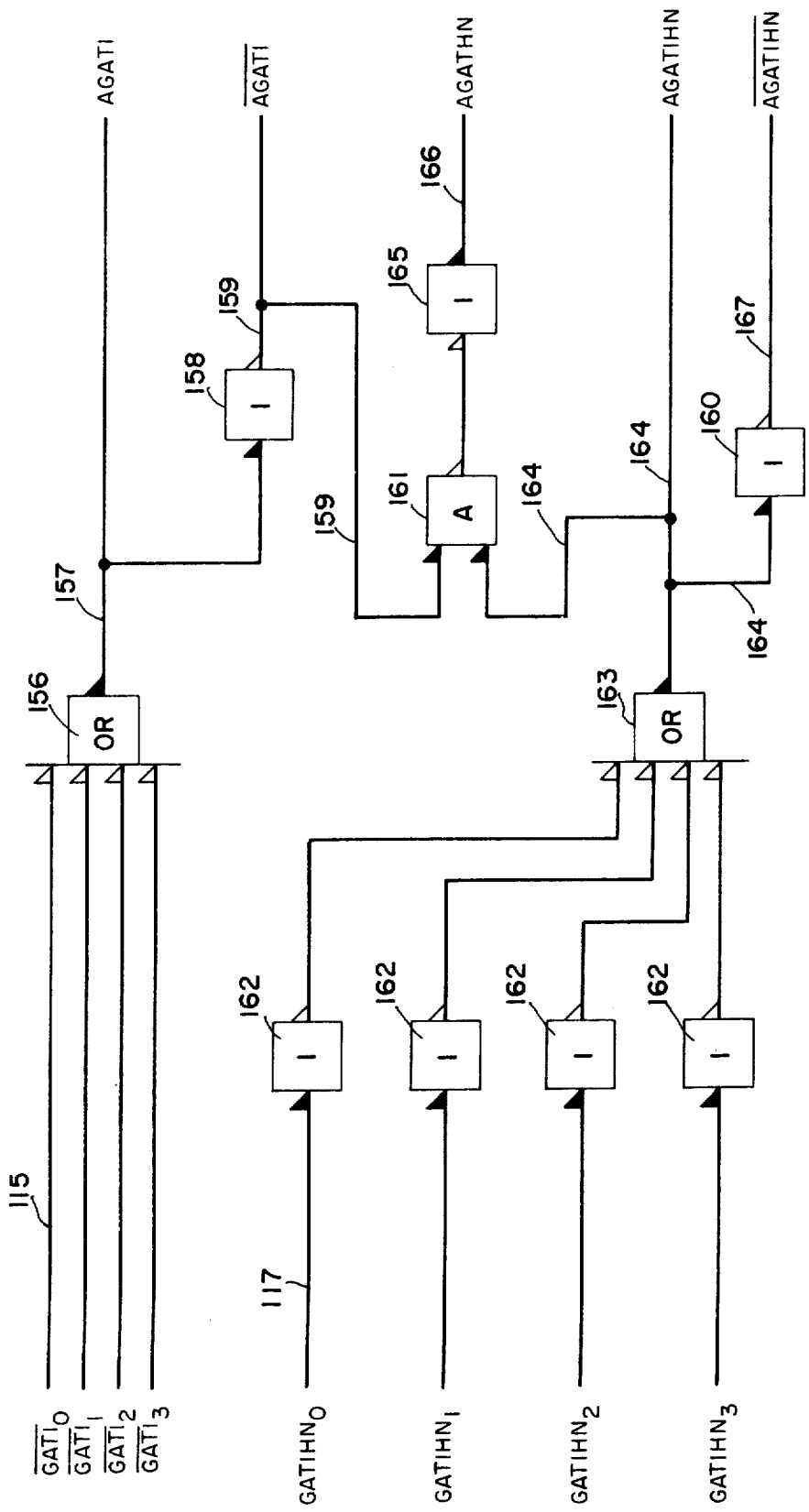

There is a low active gated attention inactive ($\overline{GATI_o}$) signal on line 115 of FIG. 6. Similar signals from unit logic controllers 21 to 23 are applied to OR gate 156 to produce a high active any gated attention inactive (AGATI) signal on line 157. The signal on line 157 is inverted at inverter 158 producing a $\overline{AGATI}$ signal on line 159. The low active $\overline{AGATI}$ signal on line 159 is applied as a low active signal to AND gate 161 which requires a high active signal for activation; thus, the $\overline{AGATI}$ signal is an inhibiting input to gate 161 when an inactive priority gated attention signal is active in control unit 14.

There is a high active gated attention inactive or high or normal priority ($GATIHN_o$) signal on line 117. Similar signals from unit logic controllers 21 to 23 are applied to gates 162. The outputs of gates 162 are buffered inputs to OR gate 163 to produce a AGATIHN signal on line 164. The high active AGATIHN output from OR gate 163 on line 164 is applied to AND gate 161 along with the aforementioned $\overline{AGATI}$ signal on line 159, and when both input conditions are met, there is a low active output $\overline{AGATHN}$ signal applied to inverter 165 which produces a high active AGATHN signal on line 166. The AGATHN signal output of OR gate 163 on line 164 is also applied to inverter 160 to produce a low active $\overline{AGATIHN}$ signal on line 167.

There is a low active sector reserve high priority ($\overline{SECRESH_o}$) signal on line 118. Similar signals from unit logic controllers 21 to 23 applied to OR gate 168 of FIG. 5. The buffered output of OR gate 168 is applied to inverter 169 to produce a low active $\overline{ASECRESH}$ signal on line 171.

There is a low active signal $\overline{SECRES_o}$ signal on line 109B. Similar signals from unit logic controllers 21 to 23 are applied to OR gate 172 of FIG. 5. The buffered output from OR gate 172 is applied to inverter 173 to produce a low active $\overline{ASECRES}$ signal on line 174.

Figure 7A:
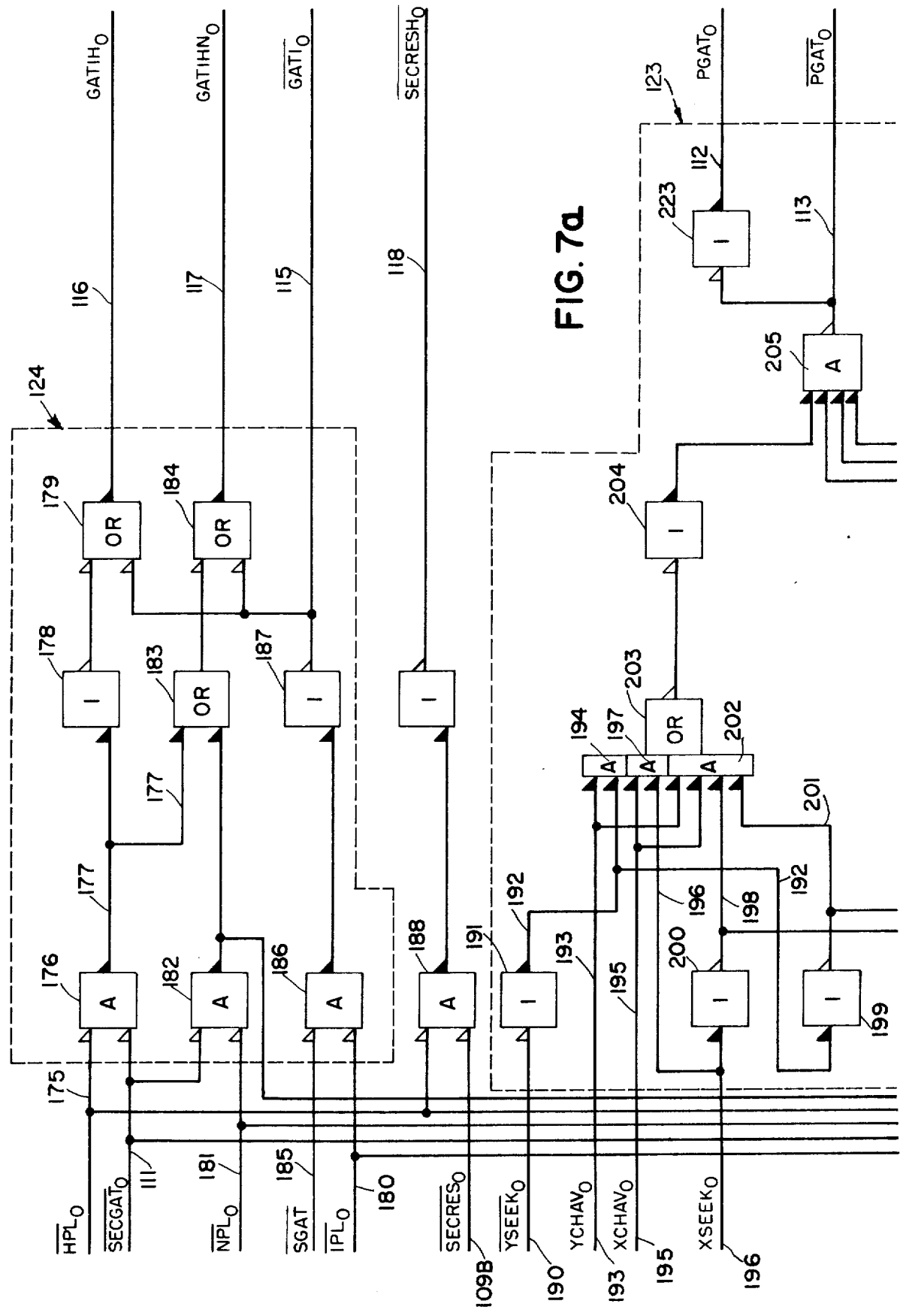

Referring now to FIG. 7 which is a detailed schematic circuit drawing showing the inputs and outputs to gates 123 and 124 of unit logic controller 20 shown in FIG. 3. There is a low active $\overline{HPL_o}$ signal on line 175 and a low active $\overline{SECGAT_o}$ on line 111 applied to AND gate 176 to produce a high active signal on line 177. The high active signal on line 177 is applied to inverter 178, and the output therefrom is applied to OR gate 179 to produce a high active gated attention inactive or high priority ($GATIH_o$) on line 116. The low active $\overline{NPL_o}$ signal on line 181 is applied to AND gate 182, and the output is applied to OR gate 183. The output of OR gate 183 is applied to OR gate 184 to produce a high active gated attention inactive or high or normal priority ($GATIHN_o$) signal on line 117. There is a low active $\overline{SGAT_o}$ signal on line 185 and a low active $\overline{IPL_o}$ signal on line 180 applied to AND gate 186 to produce a high active signal to inverter 187 which produces a low active $\overline{GATI_o}$ signal on line 115.

There is a low active $\overline{SECRES_o}$ signal on line 109B applied to AND gate 188 along with a $\overline{HPL_o}$ signal on line 175 to produce a high active signal which is applied to inverter 189 to produce a low active output $\overline{SECRESH_o}$ signal on line 118.

There is a low active Y channel seek outstanding ($\overline{YSEEK_o}$) signal on line 190 applied to inverter 191 to provide a high active signal on line 192 to AND gate 194. As a second input to AND gate 194, there is a high active Y channel available $YCHAV_o$ signal on line 193. There is a high active X channel available ($XCHAV_o$) signal on line 195 and a high active X channel seek outstanding ($XSEEK_o$) signal on line applied to AND gate 197. The $XCHAV_o$ signal on line 195 and the $YCHAV_o$ signal on line 193 are applied to AND gate 202. The $XSEEK_o$ signal on line 196 is inverted at inverter 200 and applied via line 198 to AND gate 202 along with the $\overline{YSEEK}$ output from inverter 199 which appears on line 201. The outputs of AND gates 194, 197 and 202 are buffered in OR gate 203 to produce an output signal which is inverted at inverter 204 and applied to AND gate 205. If one of the three AND gates 194, 197, 202 is satisfied, there is an output from gate 203. The $\overline{SECGAT_o}$ signal on line 111 is inverted in inverter 215 and also applied to AND gate 205. The $IPL_o$ signal on line 180 is applied to AND gate 205 as a direct input. The $\overline{NPL_o}$ signal on line 181 is inverted in inverter 206 and applied to one of the inputs of AND gate 207 along with an $\overline{ASECRESH}$ signal on line 171 and a $\overline{AGATIH}$ signal on line 155. The $\overline{HPL_o}$ signal on line 175 is inverted in inverter 208 and applied to one of the inputs of AND gate 209 along with the $\overline{AGATI}$ signal on line 159. The $\overline{LPL_o}$ signal on line 212 is applied to inverter 213, and the output is applied to AND gate 211 along with an $\overline{ASECRES}$ signal on line 174. The outputs of AND gates 207, 209 and 211 are buffered at OR gate 210, inverted at inverter 214, and the output of inverter 214 is applied as one of the high active inputs to AND gate 205. Any one of the three AND gates 207, 209, 211 may produce the input signal to inverter 214. When all of the high active inputs to AND gate 205 are present, a low active priority gated attention ($\overline{PGAT_o}$) signal is present on line 113. The output on line 113 is inverted at inverter 223 to produce a high active $PGAT_o$ signal on line 112.

The high active $PGAT_o$ signal is indicative of a priority gate attention signal raised by unit logic controller 20 at the output of gate 123. The conditions which enabled this $PGAT_o$ signal are shown at gate 205 wherein there is a seek outstanding and X channel 24X is available as indicated at inverter 204 via AND gate 197, a device end alert signal $SECGAT_o$ is active at gate 215, there is no inactive priority indicated at line 180, and the conditions which define the presence of the prevailing priority at unit logic controller 20 (not inhibited by a higher level) reserve on priority related device end alert signals from other unit logic controllers as indicated at gates 210 and 214) are present. The $PGAT_o$ signals are routed from the unit logic controller 20 to annular positioning and priority control 18 where they become effective to raise the $RGAT_o$ signal described hereinbefore.

There are two additional logic outputs produced from the basic inputs shown in FIG. 7 which are used in the control unit. The $\overline{XSEEK_o}$ signal on line 198 and the $\overline{YSEEK_o}$ signal on line 201 are applied to OR gate 216 to produce the X channel or Y channel seek outstanding ($XYSEEK_o$) signal on line 217. The output on line 217 is inverted in inverter 218 and applied via line 219 to AND gate 221 along with the $SGAT_o$ signal on line 100 to produce a low active JAM low priority 01 ($\overline{JAM01_o}$) signal on line 222. The high active XYSEEK signal on line 217 and a high active seek on seek (SONS) signal on line 235 are applied to AND gate 236 to produce a low active JAM high priority $\overline{JAM10_o}$) signal on line 237. The $\overline{JAM01_o}$ and $\overline{JAM10_o}$ signals are employed as inputs to unit logic controller 20 shown in FIG. 3. The manner in which the priority designations are set in priority register 31 have been explained hereinbefore.

The basic operation of the control system has been described when a normal priority read or write command was being processed. It will be understood that the functional blocks of the control unit, unit logic controller and storage device were selected to best support this description even though they may embody numerous electrical components. The invention described comprises an angular positioning sub-system which enables the channel of the CPU and the control unit to be operably connected to the storage device for a minimum amount of time during the process of locating a desired data record, thus, virtually eliminating latency time.

The invention described further comprises a priority sub-system which enables the program to define a priority to be associated with a seek command which defines the order in which the end of seek command signals (*device end status indications*) are to be processed. The assignment of priorities to commands provides the programmer with a tool heretofore unavailable without rewiring the control system.

Other features of the priority sub-system permit the programmer to change priorities when conditions have not been met. The sub-system may be programmed to automatically up-grade priorities when certain conditions exist. Alternatively, whole programs may be reprioritized by utilization of program interruptions or through other programming techniques. Other features of the angular positioning sub-system permit the programmer to check the angular position or angular address of a record in a manner which minimizes the latency time of the system.

Having explained the preferred mode of operation of the sub-systems, it will be understood that the principal operational steps of the system may be varied in timed sequence and that individual functional operations may be accomplished with modified structure to achieve substantially the same or identical novel results. The sector locating and priority control system is capable of operation with all types of circulating memories including bubble memories where latency time presents time delay problems.

What is claimed is:

1. In a data processing system which includes a plurality of rotatable input-output storage devices cooperating with a central processing unit, a data area locating and automatic queueing control system comprising:
   a control unit connected between said input-output devices and said central processing unit which is operable to selectably interconnect an input-output device to the central processing unit,
   a unit logic controller in said control unit for each input-output device,
   priority control means in each said unit logic controller comprising a priority register,
   each said priority register being activated by bits of a priority byte which identifies a predetermined assigned priority when the central processing unit seeks said data area,
   and gating circuit means in said control unit for queueing access to said data area in different input-output devices on the plurality of the assigned priority stored in said priority register.

2. In a data processing system of the type set forth in claim 1 wherein each said priority register has a plurity of outputs indicative of different levels of priority.

3. In a data processing system of the type set forth in claim 2 wherein each said priority register has an output indicative of at least a high and a low priority.

4. In a data processing system of the type set forth in claim 2 wherein each said priority register has an output indicative of an inactive priority.

5. In a data processing system of the type set forth in claim 4 where said gating circuit means queue an inactive priority ahead of other priorities.

6. In a data processing system of the type set forth in claim 1 wherein each said unit logic controller further includes sector locating means.

7. In a data processing system of the type set forth in claim 6 wherein said sector locating means comprises an incrementing sector counter.

8. In a data processing system of the type set forth in claim 7 wherein said sector locating means further includes a decrementing sector counter.

9. In a data processing system of the type set forth in claim 8 wherein said decrementing sector counter and said incrementing sector counter are pulsed to change their count by sector pusles indicative of parts of a revolution of the associated input-output device.

10. In a data processing system of the type set forth in claim 9 wherein said decrementing sector counter is set by the control unit with an angular sector number computed from bits of data representative of a sector address byte supplied from the central processing unit and the count then present in the incrementing sector counter, whereby the number set in the decrementing counter provides a count representing the number of sectors remaining before a desired record address being sought reaches the vicinity of the read-write heads.

11. In a data processing system of the type set forth in claim 10 wherein each said unit logic controller in said control unit further includes a reserve register, said reserve register being set with bits of data indicating sectors of reserve time.

12. In a data processing system of the type set forth in claim 11 wherein said unit logic controller further includes means for detecting a predetermined relationship between said decrementing counter and said reserve register.

13. In a data processing system of the type set forth in claim 12 wherein said means for detecting a predetermined relationship activates a reserve signal supplied to said gating circuit means for blocking output signals of a unit logic controller of an input-output device having a lower order priority stored in its priority register.

14. In a data processing system of the type set forth in claim 13 wherein said decrementing counter creates a zero count signal for terminating said reserve signal.

15. In a data processing system of the type set forth in claim 13 wherein said reserve signal is created by a bistable device which is set when said predetermined relationship between said decrementing counter and said reserve register is detected and is reset by said zero count signal.

16. In a data processing system of the type set forth in claim 13 wherein said reserve signal is effective for blocking some levels of priority of other input-output devices.

17. In a data processing system of the type set forth in claim 10 wherein said decrementing sector counter generates a zero count signal before a desired data area being sought reaches the vicinity of the read-write heads.

18. In a data processing system of the type set forth in claim 17 wherein said zero count signal activates a device end alert signal capable of informing the central processing unit that the input-output device which activated the device end alert signal has a desired data area near its read-write head.

19. In a data processing system of the type set forth in claim 18 wherein the device end alert signals from said plurality of input-output devices are processed in said gating circuit means so that the input-output device having the highest priority is effective to supress the device end alert signals of the input-output devices having lower order priorities.

20. In a data processing system of the type set forth in claim 19 wherein said unit logic controller further includes sector delay means producing a clear signal for terminating an active device end alert signal when the end alert signal has not been terminated earlier by being accepted by the control unit and the central processing unit.

21. In a data processing system of the type set forth in claim 18 wherein said control unit is operable to cooperate with a plurality of channels of one or more central processing units and said control unit further includes a channel control having means producing a protect signal for reserving the control unit for a program associated with one of said channels and one of said input-output devices.

22. In a data processing system of the type set forth in claim 21 wherein said unit logic controller further includes sector delay means for producing a drop sector signal which terminates said protect signal if not terminated earlier by the control unit and said central processing unit, said drop sector signal further defining the time limit of protection of the channel for the input-output device.

23. In a data processing system of the type set forth in claim 20 wherein said sector delay means comprises a counter stepped by the sector pulses.

24. In a data processing system of the type set forth in claim 2 wherein said gating circuit means further includes means for generating a bump signal when the control unit is busy operating with a first input-output device which has a low priority stored in its priority register and a second input-output device having a high priority stored in its priority register attempts to alert the control unit that said second input-output device is ready to actively communicate with the central processing unit.

25. In a data processing system which includes a plurality of input-output storage devices cooperating with a central processing unit, a data area locating and queueing control system comprising:
a control unit connected between said input-output devices and said central processing unit operable to selectably interconnect an input-output device to the central processing unit,
a unit logic controller in said control unit for each input-output device,
priority control means in each said unit logic controller comprising sector locating means,
each said sector locating means having an incrementing sector counter and a decrementiing sector counter adapted to change their counts when sector pulses indicative of parts of a revolution of the data in an associated input-output device are applied,
arithmetic means in said control unit for receiving the then current angular sector count from the incrementing sector counter and a sector address byte from the central processing unit and for computing a count representing the number of sectors remaining before a desired data area being sought in a selected input-output device is operationally available to the data read-write means,
and means for setting said decrementing sector counter with the computed count.

26. In a data processing system of the type set forth in claim 25 wherein said priority control means further includes a priority register and a reserve register.

27. In a data processing system of the type set forth in claim 26 wherein said priority register has an output indicative of a low priority, said low priority output being active to block the output of the reserve register.

28. In a data processing system of the type set forth in claim 26 wherein said priority register has an output indicative of a normal priority, and command gating means for changing said normal priority in said priority register to a high priority by instruction from said central processing unit.

29. In a data processing system of the type set forth in claim 28 wherein said instruction from said central processing unit comprises a seek instruction issued while a previous seek instruction is still in process, whereby the instruction employed to change the priority does not require execution.

30. In a data processing system of the type set forth in claim 25 wherein said control unit further includes a sector latch for storing the count of the sector counter in response to an instruction from the central processing unit seeking a data area in a selected input-output device.

31. In a data processing system of the type set forth in claim 30 wherein the initial portion of said instruction comprises an initial selection sequence which is effective to set said sector latch.

32. In a data processing system of the type set forth in claim 31 wherein a read sector instruction causes the incrementing sector counter of the addressed input-output device to set said sector latch and subsequently transfer the sector count set in the sector latch to the central processing unit.

33. In a data processing system of the type set forth in claim 25 wherein said control unit further includes a sector latch for storing the count of the sector counter, and said control unit further including gating means for setting the sector count in the sector latch in response to a predetermined instruction when a desired data area is located, and means for transferring said count in said sector latch to the central processing unit when a subsequent instruction from the central processing unit is issued, whereby the sector count indicative of the desired data is obtained.

34. In a data processing system of the type set forth in claim 25 wherein said control unit further includes a sector latch for storing the count of the sector counter of the selected input-output devices in response to the successful completion of a search instruction, and means in said central processing unit for reading the count of the sector latch when said data area is found.

* * * * *

UNITED STATES PATENT OFFICE
CERTIFICATE OF CORRECTION

PATENT NO. : 3990055
DATED : November 2, 1976
INVENTOR(S) : Edward E. Henderson, Akira Fujimoto, Stanley E. Gaw It is certified that error appears in the above-identified patent and that said Letters Patent are hereby corrected as shown below:

Column 28, Claim 1, line 27, change "plurality" to --basis--.

Signed and Sealed this

Twenty-second Day of March 1977

[SEAL]

Attest:

RUTH C. MASON
Attesting Officer

C. MARSHALL DANN
Commissioner of Patents and Trademarks